(12) United States Patent
Miyake et al.

(10) Patent No.: US 12,533,953 B2
(45) Date of Patent: Jan. 27, 2026

(54) VEHICLE DISPLAY CONTROL DEVICE, VEHICLE DISPLAY CONTROL SYSTEM, AND VEHICLE DISPLAY CONTROL METHOD

(71) Applicant: DENSO CORPORATION, Kariya (JP)

(72) Inventors: Yusuke Miyake, Kariya (JP); Takahisa Fujino, Kariya (JP); Toshiharu Shiratsuchi, Kariya (JP); Shiori Maneyama, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 18/161,869

(22) Filed: Jan. 30, 2023

(65) Prior Publication Data

US 2023/0166596 A1   Jun. 1, 2023

Related U.S. Application Data

(63) Continuation of application No. PCT/JP2021/027428, filed on Jul. 22, 2021.

(30) Foreign Application Priority Data

Aug. 7, 2020   (JP) .................. 2020-134987

(51) Int. Cl.
*B60K 35/00*     (2024.01)
*B60K 35/22*     (2024.01)
(Continued)

(52) U.S. Cl.
CPC .............. *B60K 35/28* (2024.01); *B60K 35/22* (2024.01); *B60K 35/60* (2024.01); *B60K 35/81* (2024.01);
(Continued)

(58) Field of Classification Search
CPC ........ B60K 35/00; B60K 35/28; B60K 35/29; B60K 2360/172; B60K 2360/1868;
(Continued)

(56) References Cited

U.S. PATENT DOCUMENTS

2017/0267238 A1\* 9/2017 Mimura .............. B60W 50/082
2018/0046185 A1    2/2018 Sato et al.
(Continued)

FOREIGN PATENT DOCUMENTS

JP   2005324661 A   11/2005
JP   2017165289 A    9/2017
(Continued)

*Primary Examiner* — Peter D Nolan
*Assistant Examiner* — Peter Y Ning
(74) *Attorney, Agent, or Firm* — Harness, Dickey & Pierce, P.L.C.

(57) ABSTRACT

In a vehicle in which a traffic congestion autonomous driving operation and a driver required driving operation are executable, a display relating to a driving operation exchange from the traffic congestion autonomous driving operation to the driver required driving operation is performed when a switching from the traffic congestion autonomous driving operation to the driver required driving operation is requested, a situation of the vehicle is specified such that the switching from the traffic congestion autonomous driving operation to the driver required driving operation is requested, and at least one of a timing of the display and a content of the display relating to the driving operation exchange is changed according to the situation.

17 Claims, 11 Drawing Sheets

(51) Int. Cl.
  *B60K 35/28* (2024.01)
  *B60K 35/60* (2024.01)
  *B60K 35/81* (2024.01)
  *B60K 35/29* (2024.01)
(52) U.S. Cl.
  CPC ........ *B60K 35/29* (2024.01); *B60K 2360/172* (2024.01); *B60K 2360/1868* (2024.01)
(58) Field of Classification Search
  CPC ........ B60K 35/60; B60K 35/81; B60K 35/22; B60W 40/04; B60W 50/14; B60W 60/00; G08G 1/16
  See application file for complete search history.

(56) References Cited

U.S. PATENT DOCUMENTS

| | | | |
|---|---|---|---|
| 2018/0229743 A1* | 8/2018 | Aoi | B60W 40/08 |
| 2018/0299889 A1* | 10/2018 | Yokota | B60W 40/09 |
| 2019/0039618 A1 | 2/2019 | Mori | |
| 2020/0391593 A1* | 12/2020 | Lee | G09G 5/373 |
| 2021/0407271 A1* | 12/2021 | Dubey | G08B 21/02 |
| 2022/0388395 A1* | 12/2022 | Kim | B60R 1/24 |

FOREIGN PATENT DOCUMENTS

| | | | |
|---|---|---|---|
| JP | 2018027726 A | 2/2018 | |
| WO | WO-2017154396 A1 | 9/2017 | |

\* cited by examiner

VEHICLE DISPLAY CONTROL DEVICE, VEHICLE DISPLAY CONTROL SYSTEM, AND VEHICLE DISPLAY CONTROL METHOD

CROSS REFERENCE TO RELATED APPLICATIONS

The present application is a continuation application of International Patent Application No. PCT/JP2021/027428 filed on Jul. 22, 2021, which designated the U.S. and claims the benefit of priority from Japanese Patent Application No. 2020-134987 filed on Aug. 7, 2020. The entire disclosures of all of the above applications are incorporated herein by reference.

TECHNICAL FIELD

The present disclosure relates to a vehicle display control device, a vehicle display control system, and a vehicle display control method.

BACKGROUND

For example, a conceivable technique provides a technique for starting and stopping an autonomous driving operation for automatically controlling acceleration and deceleration according to a traffic congestion condition. In the technique according to the conceivable technique, the autonomous driving operation is started when the traffic congestion occurs and the length of the section where the traffic congestion occurs is equal to or greater than a predetermined value. Further, the technique according to the conceivable technique teaches a technique for stopping the autonomous driving operation when it is estimated that the vehicle has exited a congestion section. In addition, there is known a technology that enables the autonomous driving operation during a traffic congestion, in which a system on the vehicle side executes the autonomous driving operation in which all driving tasks can be executed only under a condition including at least the traffic congestion case.

SUMMARY

According to an example, in a vehicle in which a traffic congestion autonomous driving operation and a driver required driving operation are executable, a display relating to a driving operation exchange from the traffic congestion autonomous driving operation to the driver required driving operation may be performed when a switching from the traffic congestion autonomous driving operation to the driver required driving operation is requested, a situation of the vehicle may be specified such that the switching from the traffic congestion autonomous driving operation to the driver required driving operation is requested, and at least one of a timing of the display and a content of the display relating to the driving operation exchange may be changed according to the situation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
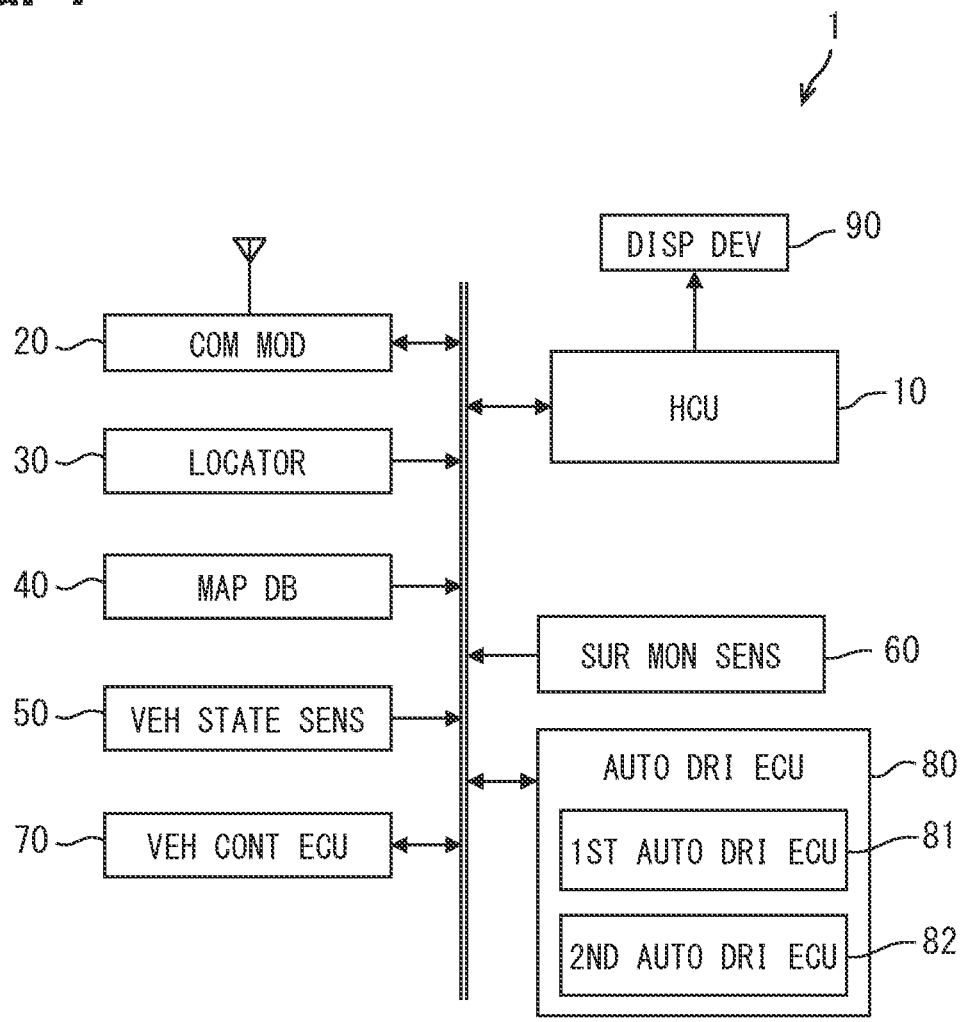
FIG. 1 is a diagram showing an example of a schematic configuration of a vehicle system.

In the autonomous driving operation during the traffic congestion, as in the technique according to the conceivable technique, when the traffic congestion is cleared, it is conceivable that the driving operation may be switched to the driver (hereinafter referred to as driver-required driving operation) so that the driver needs to execute the driving tasks. However, in the case of the autonomous driving operation in the traffic congestion, there may be several situations in which it is necessary to change the driving operation to the driver-required driving operation. Depending on the situation, it is not necessarily to change the driving operation when the traffic congestion is cleared, and it is considered that the required notification may be different. Therefore, when switching the driving operation from the autonomous driving operation in the traffic congestion to the driver-required driving operation, the notification that is easy for the driver to understand depending on the situation is under study.

One aspect of the present embodiments provides a vehicle display control device, a vehicle display control system, and a vehicle display control method which enable providing a notification that is easy for a driver to understand depending on a situation when switching a driving operation from an autonomous driving operation in a traffic congestion to a driver-required driving operation.

The above aspect is achieved by a combination of features described in independent claims, and sub-claims define further advantageous embodiments. The reference symbols in parentheses described in claims indicate correspondence to the concrete means described in the embodiment, and the concrete means is described as an example. Thus, the technical scope of the present embodiments is not necessarily limited thereto.

In order to achieve the above aspect, a vehicle display control device of the present embodiments is used for a vehicle capable of executing: a traffic congestion autonomous driving operation for performing an autonomous driving operation in which a vehicle-side system performs all riving tasks only under a condition including at least a traffic congestion situation; and a driver-required driving operation in which a driver needs to perform a part of or all of the driving tasks. The vehicle display control device includes: a display control unit that displays information relating to a driving operation exchange from the traffic congestion autonomous driving operation to the driver-required driving operation when a request is made to switch from the traffic congestion autonomous driving operation to the driver-required driving operation; and a situation specification unit that specifies a situation of the vehicle in which the request is made to switch from the traffic congestion autonomous driving operation to the driver-required driving operation. The display control unit changes at least one of a display timing and a display content relating to the driving operation exchange according to the situation specified by the situation specification unit.

In order to achieve the above aspect, the vehicle display control method of the present embodiments is used for a vehicle capable of executing: a traffic congestion autonomous driving operation for performing an autonomous driving operation in which a vehicle-side system performs all riving tasks only under a condition including at least a traffic congestion situation; and a driver-required driving operation in which a driver needs to perform a part of or all of the driving tasks. The vehicle display control method includes: a display control step for displaying information relating to a driving operation exchange from the traffic congestion autonomous driving operation to the driver-required driving operation when a request is made to switch from the traffic congestion autonomous driving operation to the driver-required driving operation; and a situation specification step for specifying a situation of the vehicle in which the request is made to switch from the traffic congestion autonomous driving operation to the driver-required driving operation. The display control step and the situation specification step are executed by at least one of processors. In the display control step, at least one of a display timing and a display content relating to the driving operation exchange is changed according to the situation specified in the situation specification step.

According to the above configuration, when switching from the traffic congestion autonomous driving operation to the driver-required driving operation, depending on the situation of the vehicle in which the request is made to switch from the traffic congestion autonomous driving operation to the driver-required driving operation, at least one of the display timing and the display content relating to the driving operation exchange from the traffic congestion autonomous driving operation to the driver-required driving operation is changed. Therefore, it is possible to execute the display with at least one of the timing and the content that match the situation of the vehicle in which the request is made to switch from the traffic congestion autonomous driving operation to the driver-required driving operation. As a result, when the driving operation is switched from the traffic congestion autonomous driving operation to the driver-required driving operation, it is possible to give a notification that is easier for the driver to understand depending on the situation.

In order to achieve the above aspect, the vehicle display control system of the present embodiments is used for a vehicle capable of executing: a traffic congestion autonomous driving operation for performing an autonomous driving operation in which a vehicle-side system performs all riving tasks only under a condition including at least a traffic congestion situation; and a driver-required driving operation in which a driver needs to perform a part of or all of the driving tasks. The vehicle display control system includes: the vehicle display control device for controlling the display of a display unit; and the display unit arranged in the vehicle and having a display surface opposed to a compartment of the vehicle.

According to this, since the vehicle display control device described above is included, it is possible to give a notification that is easier for the driver to understand depending on the situation when the driving operation is exchanged from the traffic congestion autonomous driving operation to the driver-required driving operation.

The following will describe embodiments of the present disclosure with reference to the accompanying drawings. For convenience of description, among multiple embodiments, a configuration having the same function as a configuration shown in the drawing and described in the previous embodiment may be indicated by the same reference symbol, and the description thereof may be omitted. For the configuration having the same reference symbol as in the previous embodiment, detailed description may be omitted in other embodiments.

First Embodiment

<Schematic Configuration of Vehicle System 1>

The following will describe a first embodiment of the present disclosure with reference to the accompanying drawings. A vehicle system 1 shown in FIG. 1 is used for a vehicle configured to perform an autonomous driving operation (hereinafter referred to as an autonomous driving vehicle). As shown in FIG. 1, the vehicle system 1 includes an HCU (Human Machine Interface Control Unit) 10, a communication module 20, a locator 30, a map database (hereinafter referred to as map DB) 40, a vehicle state sensor 50, a surrounding monitoring sensor 60, a vehicle control ECU 70, an autonomous driving ECU 80, and a display device 90. The vehicle system 1 corresponds to a vehicle display control system. Although the vehicle using the vehicle system 1 is not necessarily limited to an automobile, hereinafter, an example using the automobile will be described.

The degree of the autonomous driving operation (hereinafter, referred to as an autonomous level) of an autonomous driving vehicle includes multiple levels as defined by, for example, SAE. This autonomous level is classified into, for example, five levels including level 0 to level 5 as follows.

Level 0 is a level where the driver performs all driving tasks without any intervention of the system. The driving task may be rephrased as a dynamic driving task. The driving tasks include, for example, steering, acceleration and deceleration, and surrounding monitoring. The level 0 corresponds to so-called manual driving. Level 1 is a level where the system assists steering or acceleration and deceleration. The levels 1 corresponds to so-called driving assistance. The level 2 is a level where the system assists steering and acceleration and deceleration. The level 2 corresponds to so-called partial driving automation. The levels 1 and 2 are a part of the autonomous driving operation.

For example, the autonomous driving operation at levels 1 and 2 is automated driving operation in which a driver has a duty of monitoring related to safe driving (hereinafter simply referred to as a duty of monitoring). The duty of monitoring includes visual monitoring of surroundings. The autonomous driving operation at levels 1 and 2 is, in other words, autonomous driving in which a second task is not permitted. The second task is an action other than a driving operation permitted to the driver, and is a predetermined specific action. The second task is, in other words, a secondary activity, an other activity, or the like. The second task must not prevent a driver from responding to a request to take over the driving operation from the autonomous driving system. As an example, viewing of a content such as a video, operation of a smartphone, reading, and eating are assumed as the second task.

The level 3 is a level where the system performs all driving tasks in a certain location, such as a highway, and the driver performs the driving operation in an emergency situation. In the level 3, the driver must be able to respond quickly when the system requests to take over the driving operation. The level 3 corresponds to a conditional autonomous driving operation. The level 4 is a level where the system is capable of performing all driving tasks, except under a specific circumstance, such as an unsupported road, an extreme environment, and the like. The level 4 corresponds to a highly automated driving operation. The level 5 is a level where the system is capable of performing all driving tasks in any situations. The level 5 corresponds to a fully automated driving operation.

For example, the autonomous driving operation at levels 3 to 5 is an automated driving operation in which the driver does not have the duty of monitoring. The autonomous driving operation at levels 3 to 5 is, in other words, automated driving operation in which the second task is permitted. In the present embodiment, the switching between the autonomous level of level 3 or higher and the autonomous level of level 2 or lower switches the presence or absence of the duty of monitoring. Therefore, when the autonomous level is switched from the autonomous level of level 3 or higher to the autonomous level of level 2 or lower, the driver is required of monitoring related to safe driving. On the other hand, when the autonomous level of level 2 or higher is switched to the autonomous level of level 1 or lower, the driver may be required to take over the driving operation. In the present embodiment, a case in which takeover of driving operation to the driver is required when the autonomous level at level 3 or higher is switched to autonomous level at level 2 or lower will be described as an example.

The autonomous driving vehicle of the present embodiment is capable of switching the autonomous level. A configuration may be employable in which the autonomous level is switchable within a part of the levels 0 to 5. In the present embodiment, an example will be described in which an autonomous vehicle is capable of switching between the autonomous driving operation at the autonomous level 3 or higher, the autonomous driving operation at the automation level 2 or lower, or the manual driving. In the present embodiment, for example, the autonomous driving operation at automation level 3 is permitted only in a traffic congestion. In addition, in this embodiment, a configuration may be employable in which the autonomous driving operation at automation level 3 is permitted only when driving in a traffic congestion and when driving on in a specific road section such as an expressways or a motorway. In the following, a case in which autonomous driving operation at automation level 3 is permitted only when driving in a traffic congestion and when driving on in a specific road section such as an expressways or a motorway will be described. Such an autonomous driving operation at automation level 3, which is permitted only during traffic congestion, is hereinafter referred to as traffic congestion autonomous driving operation. Further, the autonomous driving operation with level 2 or lower and the manual driving are hereinafter referred to as a driver-required driving operation.

The communication module 20 transmits and receives information to and from other vehicles via wireless communications. In other words, the communication module 20 performs vehicle-to-vehicle communications. The communication module 20 may transmit and receive information via wireless communications with a roadside device installed on a roadside. In other words, the communication module 20 may perform road-to-vehicle communications. When performing the road-to-vehicle communications, the communication module 20 may receive information about a surrounding vehicle transmitted from the surrounding vehicle via the roadside device. Further, the communication module 20 may transmit and receive information to and from a center outside the subject vehicle via wireless communications. In other words, the communication module 20 may perform wide area communications. When performing the wide area communications, the communication module 20 may receive information about a surrounding vehicle transmitted from the surrounding vehicle via the center. In addition, when performing the wide area communications, the communication module 20 may receive traffic congestion information, weather information, and the like around the subject vehicle from the center.

The locator 30 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 30 combines the positioning signals received by the GNSS receiver with a measurement result of the inertial sensor to sequentially detect the position of the subject vehicle (hereinafter, subject vehicle position) on which the locator 30 is mounted. The subject vehicle position may be represented by, for example, coordinates of latitude and longitude. The subject vehicle position may be measured by using a travel distance acquired from signals sequentially output from a vehicle speed sensor mounted on the vehicle.

The map DB 40 is a non-volatile memory and stores the high-precision map data. The high-precision map data is map data with higher precision than the map data used for route guidance in a navigation function. The map DB 40 may also store map data used for route guidance. The high-precision map data includes information that can be used for the autonomous driving operation, such as three-dimensional road shape information, information on the number of lanes, and information indicating the direction of travel allowed for each lane. In addition, the high-precision map data may also include a node point information indicating the positions of both ends of a road marking such as a lane marking. Note that the locator 30 may be configured without the GNSS receiver by using the three-dimensional shape information of the road. For example, the locator 30 may be configured to identify the subject vehicle position by using the three-dimensional shape information of the road and a detection result of the surrounding monitoring sensor 60 such as a LiDAR (Light Detection and Ranging/Laser Imaging Detection and Ranging) that detects feature points of the road shape and the structure or a surrounding monitoring camera. The three-dimensional shape information of the road may be generated based on a captured image by REM (Road Experience Management).

The communication module 20 may receive map data distributed from an external server through, for example, wide area communications and may store the data in the map DB 40. In this case, the map DB 40 may be a volatile memory, and the communication module 20 may sequentially acquire the map data of an area corresponding to the subject vehicle position.

The vehicle state sensor 50 is a sensor group for detecting various states of the subject vehicle. The vehicle state sensor 50 includes a vehicle speed sensor for detecting a vehicle speed, a steering sensor for detecting a steering angle, and the like. Also, the vehicle state sensor 50 includes a steering torque sensor, an accelerator sensor, a brake sensor, and the like.

The steering torque sensor detects a steering torque applied to the steering wheel. The accelerator sensor detects whether or not the accelerator pedal is depressed. As the accelerator sensor, an accelerator depression force sensor that detects the depression force applied to the accelerator pedal may be used. As the accelerator sensor, an accelerator stroke sensor that detects the depression amount of the accelerator pedal may be used. As the accelerator sensor, an accelerator switch that outputs a signal corresponding to whether or not the accelerator pedal is depressed may be used. The brake sensor detects whether or not the brake pedal is depressed. As the brake sensor, a brake depressing force sensor that detects the depressing force applied to the brake pedal may be used. A brake stroke sensor that detects the amount of depression of the brake pedal may be used as the brake sensor. As the brake sensor, a brake switch that outputs a signal corresponding to whether or not the brake pedal is depressed may be used.

The vehicle state sensor 50 outputs detected sensing information to the in-vehicle LAN. Note that the sensing information detected by the vehicle state sensor 50 may be output to an in-vehicle LAN via an ECU mounted on the subject vehicle.

The surrounding monitoring sensor 60 monitors a surrounding environment of the subject vehicle. For example, the surrounding monitoring sensor 60 detects an obstacle around the subject vehicle, such as a pedestrian, a moving object like an other vehicle, and a stationary object, and an object on the road. The surrounding monitoring sensor 60 further detects a road surface marking such as a traffic lane marking around the subject vehicle. The surrounding monitoring sensor 60 is a sensor such as a surrounding monitoring camera that captures a predetermined range around the subject vehicle, a millimeter wave radar that transmits a search wave in a predetermined range around the subject vehicle, a sonar, or a LiDAR. The surrounding monitoring camera sequentially outputs, as sensing information, sequentially captured images to the autonomous driving ECU 80. A sensor that transmits a probe wave such as a sonar, a millimeter wave radar, a LiDAR or the like sequentially outputs, as the sensing information to the autonomous driving ECU 80, a scanning result based on a received signal acquired as a wave reflected on an obstacle on the road. The sensing information detected by the surrounding monitoring sensor 60 may be outputted to the in-vehicle LAN via the autonomous driving ECU 80.

The vehicle control ECU 70 is an electronic control device configured to perform a traveling control of the subject vehicle. The traveling control includes an acceleration and deceleration control and/or a steering control. The vehicle control ECU 70 includes a steering ECU that performs the steering control, a power unit control ECU and a brake ECU that perform the acceleration and deceleration control, and the like. The vehicle control ECU 70 is configured to output a control signal to a traveling control device such as an electronic throttle, a brake actuator, and an EPS (Electric Power Steering) motor mounted on the subject vehicle thereby to perform the traveling control.

The autonomous driving ECU 80 includes, for example, a processor, a memory, an I/O, and a bus that connects those devices, and executes a control program stored in the memory thereby to execute a process related to the autonomous driving operation. The memory referred to here is a non-transitory tangible storage medium, and stores programs and data that can be read by a computer. The non-transitory tangible storage medium may be provided by a semiconductor memory, a magnetic disk, or the like.

The autonomous driving ECU 80 includes a first autonomous driving ECU 81 and a second autonomous driving ECU 82. The following description is given assuming that each of the first autonomous driving ECU 81 and the second autonomous driving ECU 82 includes a processor, a memory, an I/O, and a bus connecting these devices. A configuration may be employable in which a common processor bears the functions of the first autonomous driving ECU81 and the second autonomous driving ECU82 by a virtualization technology.

The first autonomous driving ECU 81 provides the function of the autonomous driving operation at level 2 or lower as described above. In other words, the first autonomous driving ECU 81 enables the autonomous driving operation that requires the duty of monitoring to the driver. For example, the first autonomous driving ECU 81 is capable of executing at least one of a longitudinal direction control in a longitudinal direction and a lateral direction control in a lateral direction of the subject vehicle. The longitudinal direction is a direction that coincides with a front-rear direction of the subject vehicle. The lateral direction is a direction that coincides with a right-left direction of the subject vehicle. The first autonomous driving ECU 81 executes, as the longitudinal direction control, the acceleration and deceleration control of the subject vehicle. The first autonomous driving ECU 81 executes, as the lateral direction control, the steering control of the subject vehicle. The first autonomous driving ECU 81 includes, as functional blocks, a first environment recognition unit, an ACC control unit, an LTA control unit, and the like.

The first environment recognition unit recognizes a driving environment around the subject vehicle based on the sensing information acquired from the surrounding monitoring sensor 60. As an example, the first environment recognition unit recognizes a detailed position of the subject vehicle in a driving lane (hereinafter, subject vehicle lane) from information such as left and right lane markings of the driving lane in which the subject vehicle travels. In addition, the first environment recognition unit recognizes a position and a velocity of an obstacle such as another vehicle around the subject vehicle. The first environment recognition unit recognizes the position and the speed of an obstacle such as another vehicle in the subject vehicle lane. In addition, the first environment recognition unit recognizes the position and speed of an obstacle such as another vehicle in a surrounding lane of the subject vehicle lane. The surrounding lane may be, for example, a lane adjacent to the subject vehicle lane. Alternatively, the surrounding lane may be a lane other than the subject vehicle lane in a road section where the subject vehicle is located. Note that the first environment recognition unit may have the same configuration as the second environment recognition unit described later.

The ACC control unit executes an ACC control (Adaptive Cruise Control) to perform constant-speed traveling of the subject vehicle at a target speed or following travel with respect to the preceding vehicle. The ACC control unit may perform ACC control using the position and the velocity of the vehicle around the subject vehicle recognized by the first environment recognition unit. The ACC control unit may cause the vehicle control ECU 70 to perform the acceleration and deceleration control thereby to perform the ACC control. An LTA control unit executes an LTA (Lane Tracing Assist) control to maintain the subject vehicle to drive within the lane. The LTA control unit may perform the LTA control using the detailed position of the subject vehicle in the subject vehicle lane recognized by the first environment recognition unit. The LTA control unit may cause the vehicle control ECU 70 to perform the steering control thereby to perform the LTA control. Note that the ACC control is an example of the longitudinal direction control. The LTA control is an example of the lateral direction control.

The first autonomous driving ECU 81 performs both the ACC control and the LTA control thereby to realizes the autonomous driving operation at level 2. The first autonomous driving ECU 81 may perform either the ACC control or the LTA control thereby to realize the autonomous driving operation at level 1.

On the other hand, the second autonomous driving ECU 82 provides the function of the autonomous driving operation at level 3 or higher. In other words, the second autonomous driving ECU 82 enables the autonomous driving operation that does not require the duty of monitoring to the driver. The second autonomous driving ECU 82 includes, as functional blocks, a second environment recognition unit, an action determination unit, a trajectory generation unit, and the like.

The environment recognition unit recognizes the driving environment around the subject vehicle based on the sensing information, which is acquired from the surrounding monitoring sensor 60, the subject vehicle position, which is acquired from the locator 30, the map data, which is acquired from the map DB 40, the vehicle information, which acquired by the communication module 20, and the like. As an example, the second environment recognition unit uses these pieces of information to generate a virtual space that reproduces an actual driving environment.

The second environment recognition unit determines a manual driving area (hereinafter referred to as an MD area) in a travelling area of the subject vehicle. The second environment recognition unit determines an autonomous driving area (hereinafter referred to as an AD area) in the travelling area of the subject vehicle. The second environment recognition unit determines an ST section in the AD area. The second environment recognition unit determines a non-ST section in the AD area.

The MD area is an area where the autonomous driving is prohibited. In other words, the MD area is an area where the driver performs all of the longitudinal control, the lateral control and the surrounding monitoring of the subject vehicle. For example, the MD area may be an ordinary road.

The AD area is an area where the autonomous driving is permitted. In other words, the AD area is an area where a system in the subject vehicle is capable of performing at least one of the longitudinal control, the lateral control, and the surrounding monitoring, instead of the driver. For example, the AD area may be a highway or a motorway.

The AD area is divided into the non-ST section where the autonomous driving operation at level 2 or lower is possible and the ST section where the autonomous driving operation at level 3 or higher is possible. In the present embodiment, the non-ST section, in which the autonomous driving operation at level 1 is permitted, and the non-ST section, in which the autonomous driving operation at level 2 is permitted, are not classified. The ST section may be, for example, a traveling section in which a traffic congestion occurs (hereinafter, a traffic congestion section). Further, the ST section may be, for example, a traveling section in which a high-precision map date is prepared. The non-ST section may be a section other than the ST section.

The action determination unit determines an action, which is scheduled for the subject vehicle (hereinafter referred to as a future action), based on a recognition result of the driving environment by the second environment recognition unit and the like. The action determination unit determines a future action for causing the subject vehicle to perform the autonomous driving operation. The action determination unit may determine, as the future action, a type of action that the subject vehicle should take in order to arrive at a destination. This type includes, for example, going straight, turning right, turning left, and changing lanes.

Further, when the action determination unit determines that it is necessary to transfer a driving control right to the driver (i.e., the driving operation exchange), the action determination unit generates an exchange request and provides the exchange request to the HCU 10. One example of a case where the exchange of the driving operation is required is a case where the subject vehicle moves from an ST section in the AD area to the non-ST section. Another example of a case where the exchange of the driving operation is required is a case where the subject vehicle moves from the ST section of the AD area to the MD area. Another cause of the exchange of the driving operation (hereinafter referred to as an exchange factor) includes elimination of traffic congestion and lack of the high-precision map data.

Shortage of the high-definition map data is predictable. The action determination unit may estimate the lack of the high-precision map data for the planned route of the subject vehicle using the vehicle position measured by the locator 30 and the high-precision map data stored in the map DB 40. Then, when the action determination unit estimates a shortage of high-precision map data, it determines that a driving operation exchange is necessary, and outputs an exchange request to the HCU 10 before the vehicle reaches a point where the shortage of high-precision map data is estimated.

Elimination of traffic congestion may be predictable or unpredictable. More specifically, when the communication module 20 is capable of receiving traffic congestion information and information on a surrounding vehicle, the communication module 20 is capable of predicting the elimination of the traffic congestion from these pieces of information. The action determination unit may estimate elimination of traffic congestion on the scheduled route of the subject vehicle using the vehicle position measured by the locator 30 and the traffic congestion information received by the communication module 20. In addition, the action estimation unit may use the numerical number of and the speed of surrounding vehicles specified from the information on the surrounding vehicles received by the communication module 20 to estimate the elimination of traffic congestion on the scheduled route of the subject vehicle.

Then, when the action determination unit estimates that the congestion will be eliminated, the action determination unit determines that it is necessary to exchange the driving operation, and outputs an exchange request to the HCU 10 before the vehicle reaches a point where the congestion is estimated to be eliminated.

On the other hand, when the communication module 20 cannot receive the traffic congestion information and the information about the surrounding vehicles, it is assumed that the elimination of the traffic congestion cannot be predicted. When it is not possible to predict that the traffic congestion will be eliminated, the number of surrounding vehicles, the speed of the surrounding vehicle, and the like recognized by the second environment recognition unit using the surrounding monitoring sensor 60 may be used to determine whether the traffic congestion will be eliminated. Then, when it is determined that the congestion has been eliminated, the action determination unit determines that the driving operation exchange is necessary, and outputs the exchange request to the HCU 10.

In addition, there is a case where the exchange of the driving operation is required other than a factor of elimination of traffic congestion and a factor of lack of the high-precision map data. For example, a change in a road structure, sudden sensor signal loss, sudden bad weather, and the like can be considered. A change in the road structure that requires the takeover of driving operation includes an end of a section with a median strip, a decrease in the number of lanes, and entry into a construction section. The reason why these changes in the road structure cause the takeover of driving operation is that there is a possibility that an accuracy of recognizing the driving environment may decrease. The change in the road structure is predictable. The action determination unit may predict change in the road structure, such as the end of a section of the scheduled route of the subject vehicle with a median strip and decrease in the number of lanes, using the vehicle position measured by the locator 30 and the high-precision map data stored in the map DB 40. In addition, the action determination unit may predict change in the road structure such as the subject vehicle entering a construction section, based on presence of a signboard under construction recognized by the second environment recognition unit using the surrounding monitoring sensor 60. When the action determination unit predicts these changes in the road structure, it determines that it is necessary to exchange the driving operation, and outputs the exchange request to the HCU 10 before the subject vehicle reaches the point where the changes in the road structure occur.

Sudden sensor signal loss is a failure of the surrounding monitoring sensor 60, a failure of recognition of the driving environment using the surrounding monitoring sensor 60, and the like. The sudden bad weather includes heavy rain, snow, fog, and the like. The reason why sudden bad weather causes the takeover of driving operation is that there is a possibility that the recognition accuracy of the driving environment using the surrounding monitoring sensor 60 is lowered. Another reason why sudden bad weather may cause the takeover of driving operation is that there is a possibility that failure in communications would occur in the communication module 20. Sudden sensor signal loss and sudden bad weather cannot be predicted. The action determination unit may determine sudden sensor signal loss and sudden bad weather from a recognition result of the driving environment by the second environment recognition unit. Further, when the action determination unit determines sudden sensor signal loss or sudden bad weather, it may determine that the driving operation exchange is necessary and output an exchange request to the HCU 10.

When the factor of the exchange can be predicted, the action determination unit outputs an exchange request to the HCU 10 before the factor of the exchange occurs. On the other hand, when the factor of the exchange cannot be predicted, the action determination unit outputs an exchange request to the HCU 10 after the factor of the exchange occurs.

Here, the exchange factor can be classified into the following four patterns. The first pattern is the elimination of traffic congestion predictable. The second pattern is the elimination of traffic congestion unpredictable. The third pattern is predictable factors other than elimination of traffic congestion. The fourth pattern is unpredictable factors other than elimination of traffic congestion. The third pattern includes lack of high-precision map data and changes in road structure. The fourth pattern includes sudden sensor signal loss and sudden bad weather. Predictable sensor signal loss and predictable bad weather may be included in the third pattern, for example.

Figure 2:
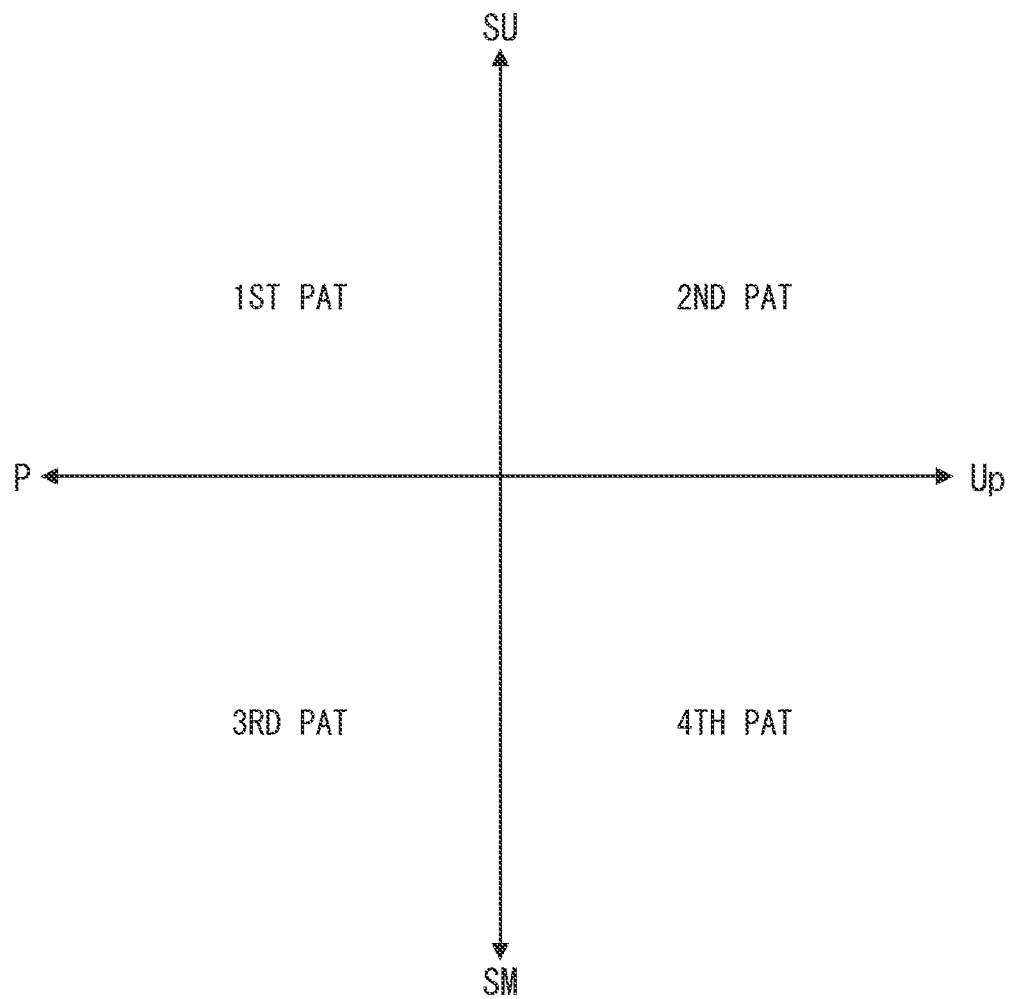
FIG. 2 is a diagram for explaining grouping of four patterns of exchange factors.

Also, the four patterns from the first pattern to the fourth pattern can be grouped as shown in FIG. 2. SU in FIG. 2 indicates that the speed of the subject vehicle increases after the exchange of driving operation. SM in FIG. 2 indicates that the vehicle speed of the subject vehicle is maintained even after the driving operation exchange. P in FIG. 2 indicates that driving operation exchange can be predicted. Being predictable of the driving operation exchange is rephrased as being able to issue a notification of an instruction for the driving operation exchange (hereinafter referred to as a driving operation exchange notification) before the exchange factor occurs. Also, Up in FIG. 2 indicates that the exchange of driving operation is unpredictable. Being unpredictable of driving operation exchange is rephrased as not being able to issue a notification of driving operation exchange before the exchange factor occurs.

As shown in FIG. 2, the first pattern and the second pattern are classified into a group in which the vehicle speed increases after the exchange of driving operation. This is because in the first and second patterns, the exchange factor is the elimination of traffic congestion, and the vehicle speed increases after the exchange of driving operation. On the other hand, the third pattern and the fourth pattern are classified into a group in which the vehicle speed of the subject vehicle is maintained even after the driving operation exchange. This is because, in the third and fourth patterns, the exchange factor is other than the elimination of traffic congestion, and the traffic congestion continues even after the exchange of driving operation, and the vehicle speed cannot be increased. In addition, as shown in FIG. 2, the first pattern and the third pattern are classified into a group in which the driving operation exchanges can be predicted. On the other hand, the second pattern and the fourth pattern are classified into a group in which the driving operation exchange is unpredictable.

The trajectory generation unit generates the travel trajectory of the subject vehicle in a section, in which the autonomous driving can be performed, based on the recognition result of the driving environment by the second environment recognition unit and the future action determined by the action determination unit. The travel trajectory includes, for example, a target position of the subject vehicle according to a progress, a target speed at each target position, and the like. The trajectory generation unit sequentially provides the generated travel trajectory, as a control command to be followed by the subject vehicle in the autonomous driving operation, to the vehicle control ECU 70.

With the autonomous driving system including the autonomous driving ECU 80, the autonomous driving operation at level 2 or lower and the autonomous driving operation at level 3 or higher can be executed in the subject vehicle. Further, for example, the autonomous driving ECU 80 may be configured to switch the autonomous level of the autonomous driving operation of the subject vehicle as necessary. As an example, the autonomous driving operation at Level 3 may be switched to the autonomous driving operation at Level 2 or lower, when the subject vehicle moves from the ST section to the non-ST section in the AD area. Further, the autonomous driving ECU 80 may switch from the autonomous driving operation at level 3 to manual driving operation when the subject vehicle moves from the ST section in the AD area to the MD area.

The display device 90 is a display unit provided to the subject vehicle. The display device 90 is provided so that a display surface is oriented to an interior of the subject vehicle. For example, the display device 90 is provided so that the display surface is positioned in front of the driver seat of the subject vehicle. As the display device 90, various display units, such as a liquid crystal display, an organic EL display, and a head-up display (hereinafter referred to as an HUD), may be used.

The HCU 10 mainly includes a computer including a processor, a volatile memory, a nonvolatile memory, an I/O, and a bus connecting these devices. The HCU 10 is connected to the display device 90 and the in-vehicle LAN. The HCU 10 executes a control program stored in the nonvolatile memory, thereby to control indication of the display device 90. The HCU 10 corresponds to a vehicle display control device. The configuration of the HCU 10 for controlling indication of the display device 90 will be described in detail below.

<Schematic Configuration of HCU 10>

Figure 3:
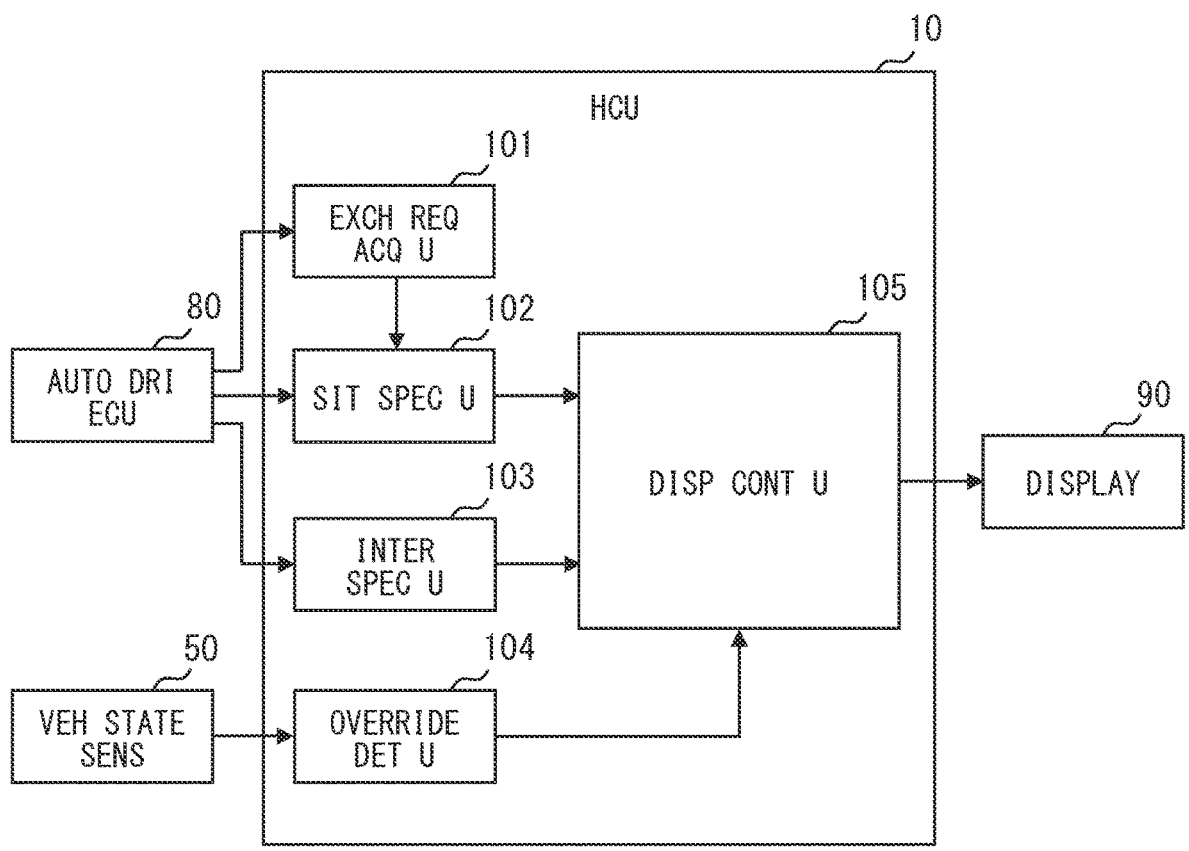
FIG. 3 is a diagram showing an example of a configuration of an HCU.

Herein, a schematic configuration of the HCU 10 will be described with reference to FIG. 3. The HCU 10 provides, for a control of the indication of the display device 90, as shown in FIG. 3, an exchange request acquisition unit 101, a situation specification unit 102, an interruption specification unit 103, an override detection unit 104, and a display control unit 105 as functional blocks. Execution of a process of each functional block of the HCU 10 by the computer corresponds to execution of a vehicle display control method. Some or all of the functions executed by the HCU 10 may be produced by hardware using one or more ICs or the like. Alternatively, some or all of the functions executed by the HCU 10 may be implemented by a combination of execution of software by a processor and a hardware device.

The exchange request acquisition unit 101 acquires an exchange request output from the autonomous driving ECU 80. When the exchange request is output from the autonomous driving ECU 80, the exchange request acquisition unit 101 acquires the exchange request.

The situation specification unit 102 specifies a situation of the subject vehicle that requires switching from the traffic congestion autonomous driving operation to the driver-required driving operation (that is, driving operation exchange). The processing by the situation specification unit 102 corresponds to the situation specification step. For example, when the exchange request acquisition unit 101 acquires an exchange request, the situation specification unit 102 may specify a situation of the subject vehicle that requires an exchange of the driving operation requested by the exchange request (hereinafter referred to as an exchange situation).

It is assumed that there are, for example, four types of exchange situations. The first situation is assumed to be a takeover situation in which the exchange factor corresponds to the above-described first pattern. The second situation is assumed to be a takeover situation in which the exchange factor corresponds to the above-described second pattern. The third situation is assumed to be a takeover situation in which the exchange factor corresponds to the above-described third pattern. The fourth situation is assumed to be a takeover situation in which the exchange factor corresponds to the above-described fourth pattern. In other words, the first situation and the second situation correspond to situations in which the exchange factor is the elimination of traffic congestion. On the other hand, the third situation and the fourth situation correspond to situations in which the exchange factor is not the elimination of traffic congestion. Also, the first situation and the third situation correspond to situations in which driving operation exchange can be predicted. In other words, these correspond to a situation in which it is possible to notify the driving operation exchange before the exchange factor occurs. On the other hand, the second situation and the fourth situation correspond to situations in which driving operation exchange cannot be predicted. In other words, these correspond to a situation in which it is not possible to notify the driving operation exchange before the exchange factor occurs.

The situation specification unit 102 may specify the first situation when the action determination unit of the autonomous driving ECU 80 predicts that the traffic congestion will be eliminated. The situation specification unit 102 may specify the second situation when the action determination unit of the autonomous driving ECU 80 determines that the traffic congestion is not eliminated without predicting the elimination of the traffic congestion. The situation specification unit 102 may specify the third situation when the action determination unit of the autonomous driving ECU 80 predicts an exchange factor other than the elimination of traffic congestion. The estimated exchange factor other than the elimination of the traffic congestion may include the aforementioned lack of high-precision map data and changes in road structure. The situation specification unit 102 may specify the fourth situation when the action determination unit of the autonomous driving ECU 80 does not predict an exchange factor other than the elimination of traffic congestion. The not-estimated exchange factor other than the elimination of traffic congestion may include sudden sensor signal loss and sudden bad weather.

The interruption specification unit 103 specifies whether or not there is an interruption by another vehicle in the vicinity of the subject vehicle into the travel lane of the subject vehicle (that is, the subject lane). The interruption specification unit 103 may specify whether the interruption of a surrounding vehicle into the subject vehicle lane occurs, for example, from the recognition result of the surrounding vehicle of the subject vehicle in the driving environment recognized by the first environment recognition unit of the autonomous driving ECU 80. For example, it is possible to specify whether or not there is an interruption by a surrounding vehicle into the subject vehicle lane based on whether or not the acceleration of the surrounding vehicle toward the subject vehicle lane has reached or exceeded a threshold value. Further, it may be determined whether or not a surrounding vehicle interrupts the subject vehicle lane based on whether or not the blinker lamp of the surrounding vehicle on the subject vehicle lane side is turned on. The lighting of the blinker lamp of the surrounding vehicle may be recognized by the first environment recognition unit through image analysis of an image captured by the surrounding monitoring camera. In addition, when the information about a surrounding vehicle received by the communication module 20 includes information that indicates that the surrounding vehicle is to interrupt the subject vehicle lane, the interruption specification unit 103 may specify whether interruption of the surrounding vehicle into the subject vehicle lane occurs using this information.

The override detection unit 104 detects an override, which is an operation of the driver of the subject vehicle to voluntarily acquire the right to control the subject vehicle. The override detection unit 104 may detect the override operation from sensing information obtained from the vehicle state sensor 50. For example, the override detection unit 104 may detect the override operation when the steering torque detected by the steering torque sensor exceeds a threshold. Also, the override detection unit 104 may detect the override operation when the accelerator sensor detects depression of the accelerator pedal. In addition, the override detection unit 104 may detect the override operation when the brake sensor detects depression of the brake pedal.

The display control unit 105 displays information relating to a driving operation exchange from the traffic congestion autonomous driving operation to the driver-required driving operation when it is necessary to switch from the traffic congestion autonomous driving operation to the driver-required driving operation. Processing by the display control unit 105 corresponds to a display control process. Since the exchange request acquisition unit 101 has acquired the exchange request, the display control unit 105 may determine that it is necessary to switch from the traffic congestion autonomous driving operation to the driver-required driving operation.

The display related to the driving operation exchange includes an exchange instruction display, a display after the driving operation exchange, an advance display, and the like. The exchange instruction display is a display as a driving operation exchange notification for instructing the driving operation exchange. An example of the exchange instruction display is a display of text, an icon, or the like that urges the driver to change the driving operation. The display after driving operation exchange is a display after the driving operation is exchanged. The display after driving operation exchange is the display of information necessary for the autonomous driving operation with automation level 2 or lower and the manual operation after the driving operation exchange. As an example of the display after the driving operation exchange, there is a display such as an image showing information about the speed of the subject vehicle and the surroundings of the subject vehicle. An example of the information about the surroundings of the subject vehicle is a diagram showing the positional relationship of surrounding vehicles with respect to the subject vehicle. The advance display is a display in which the information to be displayed after the driving operation exchange is displayed prior to the driving operation exchange. Examples of the advance display include a combination of the information of the exchange instruction display and the information after the driving operation exchange, and a combination of the simplified information of the exchange instruction display and the information of the display after the driving operation exchange.

The display control unit 105 changes at least one of a display timing and a display content relating to the driving operation exchange according to the situation specified by the situation specification unit 102. More specifically, the timing of the exchange instruction display, the content of the exchange instruction display, the presence or absence of the advance display, the content of the display after the driving operation exchange and the like are changed.

The display control unit 105 may preferably change the timing and the content of the display regarding the driving operation exchange depending on whether or not the situation specified by the situation specification unit 102 is a situation in which the exchange instruction display is performed before the exchange factor occurs. The timing of the exchange instruction display and the driver's margin from the exchange instruction display to the driving exchange depends on whether there is a situation such that the exchange instruction display is performed before the exchange factor occurs. On the other hand, according to the above configuration, it is possible to change the timing of the exchange instruction display and/or change the display content to the content of the exchange instruction display according to the driver's margin, depending on whether it is a situation such that the exchange instruction display is to be performed before the exchange factor occurs. In addition, the first situation and the third situation correspond to the situations in which the exchange instruction display is performed before the occurrence of the exchange factor.

When the situation specified by the situation specification unit 102 is a situation in which the exchange instruction display is to be performed after the occurrence of the exchange factor, the display control unit 105 may preferably display the information to be displayed after the driving operation exchange as the advance display in advance before the completion of the driving operation exchange. On the other hand, it may be preferable that the display control unit 105 does not perform the advance display in a situation in which the exchange instruction display is performed before the occurrence of the exchange factor. In a situation in which the exchange instruction display is performed after the occurrence of the exchange factor, the grace period from the display of the exchange instruction display to the driving operation exchange is short. On the other hand, the advance display allows the driver to quickly grasp the situation by displaying the information to be displayed after the driving operation exchange in advance before the driving operation exchange is completed. In addition, the second situation and the fourth situation correspond to the situations in which the exchange instruction display is performed after the occurrence of the exchange factor.

When performing the advance display, the display control unit 105 may preferably displays the exchange instruction display in addition to the advance display until the driving operation exchange is completed. According to this, even when the advance display is performed, the driver can easily recognize from the exchange instruction display that the driving operation exchange is necessary. When the exchange instruction display is performed together with the advance display, for example, the exchange instruction display may be displayed by simplifying the information or narrowing the display area compared to the case where the exchange instruction display is not displayed together with the advance display. Further, when the exchange instruction display is performed together with the advance display, one of the displays may be superimposed on the other or the displays may be displayed in separate display areas.

When the situation specified by the situation specification unit 102 is a situation in which the exchange factor is not the elimination of traffic congestion, the display control unit 105 may provide the display after driving operation exchange with a lower degree of the detail with respect to the information about the surroundings of the subject vehicle than a situation where the exchange factor is the elimination of traffic congestion. When the situation specified by the situation specification unit 102 is a situation in which the exchange factor is not the elimination of traffic congestion, the display control unit 105 may provide the display after driving operation exchange with a lower degree of the detail with respect to the information about the surroundings of the subject vehicle than a situation where the exchange factor is the elimination of traffic congestion.

In the situation where the exchange factor is the resolution of traffic congestion, the speed of the subject vehicle increases after the driving operation exchange, so that it is necessary to pay more attention to the surroundings of the subject vehicle. Therefore, there may be a high need for more detailed information about the surroundings of the subject vehicle. On the other hand, in a situation where the exchange factor is not the elimination of traffic congestion, the traffic congestion may continue even after driving operation exchange, and the vehicle speed does not increase, so there may be less need to pay attention to the surroundings of the vehicle. Therefore, there may be a low need for more detailed information about the surroundings of the subject vehicle. On the other hand, according to the above configuration, it is possible to change the degree of detail of the information about the surroundings of the subject vehicle according to the need for more detailed information about the surroundings of the subject vehicle after the driving operation exchange for each situation. It should be noted that the third situation and the fourth situation correspond to the situation in which the exchange factor is not the elimination of traffic congestion. On the other hand, the first situation and the second situation correspond to the situation in which the exchange factor is the elimination of traffic congestion.

When the situation specified by the situation specification unit 102 is a situation in which the exchange factor is the elimination of traffic congestion, the display control unit 105 may preferably perform the display after the driving operation exchange including the information about the subject vehicle lane and the surrounding lanes as information about the surroundings of the subject vehicle. On the other hand, when the situation specified by the situation specification unit 102 is a situation in which the exchange factor is not the elimination of traffic congestion, the display control unit 105 may preferably perform the display after the driving operation exchange including the information about only the subject vehicle lane as information about the surroundings of the subject vehicle.

In a situation where the exchange factor is the resolution of traffic congestion, as described above, it is necessary to pay more attention to the surroundings of the subject vehicle. Therefore, it is highly necessary to include not only the information of the subject vehicle lane but also the information of the surrounding lanes in the display after driving operation exchange. On the other hand, in the situation where the exchange factor is not the elimination of traffic congestion, as described above, there is less need to pay attention to the surroundings of the subject vehicle. Therefore, it is less necessary to include the information of the surrounding lanes in the display after driving operation exchange in addition to the information of the subject vehicle lane. On the other hand, according to the above configuration, it is possible to adjust whether or not to include the information on the surrounding lanes of the subject vehicle in the display after the driving operation exchange, according to the necessity of the information on the surrounding lanes after the driving operation exchange for each situation. The information on the subject vehicle lane may be, for example, a diagram showing the lane markings of the subject lane and the positional relationship of surrounding vehicles in the subject vehicle lane with respect to the subject vehicle. The information about the surrounding lanes may be, for example, a diagram showing the lane markings of the subject vehicle lane and the positional relationship of the surrounding vehicles in the surrounding lanes with respect to the subject vehicle.

The display control unit 105 may preferably change the display after driving operation exchange to the display after driving operation exchange with the information about the surrounding lanes in addition to the subject vehicle lane when the interruption specification unit 103 specifies that the surrounding vehicle interrupts into the subject vehicle lane under a situation where the display after driving operation exchange is performed with the information about ony the subject vehicle lane. When there is a surrounding vehicle that enters into the subject vehicle lane, it is highly necessary to pay attention to the surrounding lanes as well. On the other hand, according to the above configuration, it is possible to display the information about the surrounding lanes when it becomes necessary to pay attention to the surrounding lanes even in the situation where the display after driving operation exchange including only the information of the subject lane out of the subject lane and the surrounding lanes is performed.

The display control unit 105 may preferably change the display after driving operation exchange to the display after driving operation exchange with the information about the surrounding lanes in addition to the subject vehicle lane when the override detection unit 104 detects the override operation in a situation where the display after the driving operation exchange is performed including information only on the subject vehicle lane out of the subject vehicle lane and the surrounding lanes as information about the surroundings of the subject vehicle. When an override operation occurs, the behavior of the subject vehicle may change suddenly, so it is highly necessary to pay attention to the surrounding lanes as well. On the other hand, according to the above configuration, it is possible to display the information about the surrounding lanes when it becomes necessary to pay attention to the surrounding lanes even in the situation where the display after driving operation exchange including only the information of the subject lane out of the subject lane and the surrounding lanes is performed.

Below, the example of the display control by the display control part 105 for every four types of situations from the first situation to the fourth situation is described.

Example of Display Control According to First Situation

Figure 4:
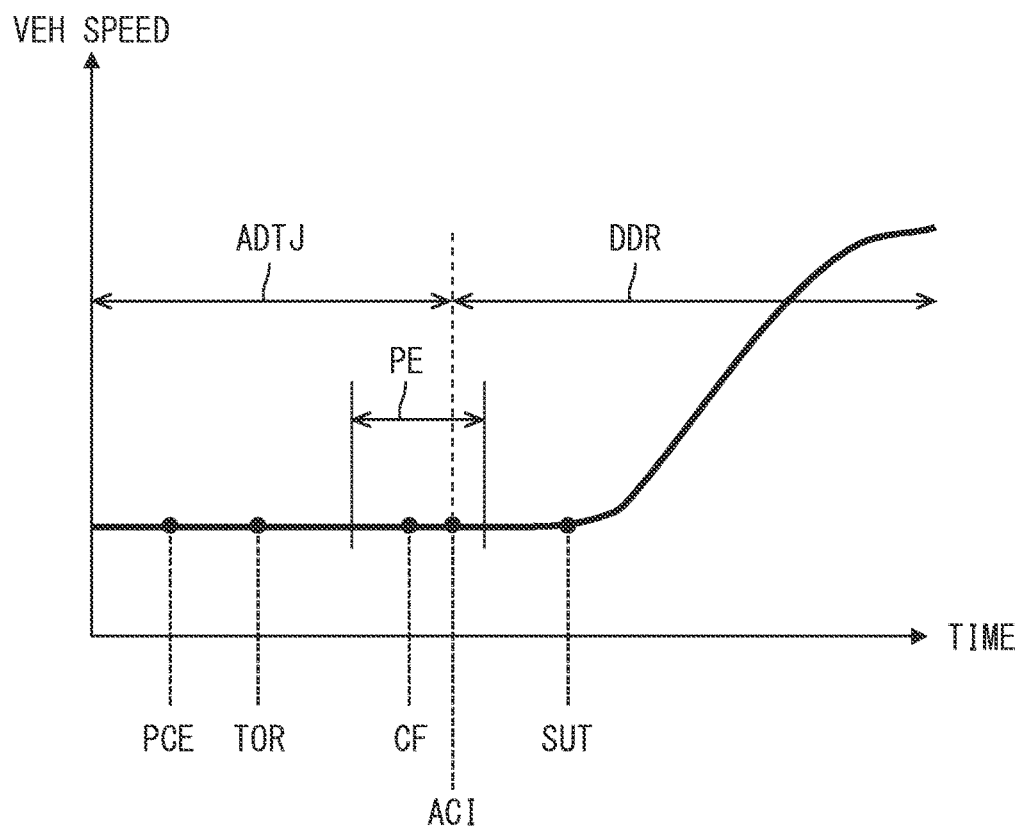
FIG. 4 is a diagram for explaining the timing of events related to display control in the first situation.

First, an example of display control according to the first situation will be described. FIG. 4 is a diagram for explaining the timing of events related to display control in the first situation. The vertical axis in FIG. 4 indicates the vehicle speed of the subject vehicle. The horizontal axis in FIG. 4 indicates time. ADTJ in FIG. 4 indicates the period of traffic congestion autonomous driving operation. DDR in FIG. 4 indicates the period of the driver-required driving operation. PCE in FIG. 4 shows the timing at which the elimination of traffic congestion is predicted. TOR in FIG. 4 indicates the timing at which the exchange instruction display is performed. CF in FIG. 4 indicates the timing of completion of driving operation exchange. ACI in FIG. 4 indicates the timing at which the display after driving operation exchange is performed. SUT in FIG. 4 indicates the timing at which the speed of the subject vehicle increases. PE in FIG. 4 indicates the period during which the traffic congestion is estimated to be eliminated. Since the elimination of traffic congestion is an estimation, it is assumed that the congestion will be eliminated at any point within a certain period.

Figure 5:
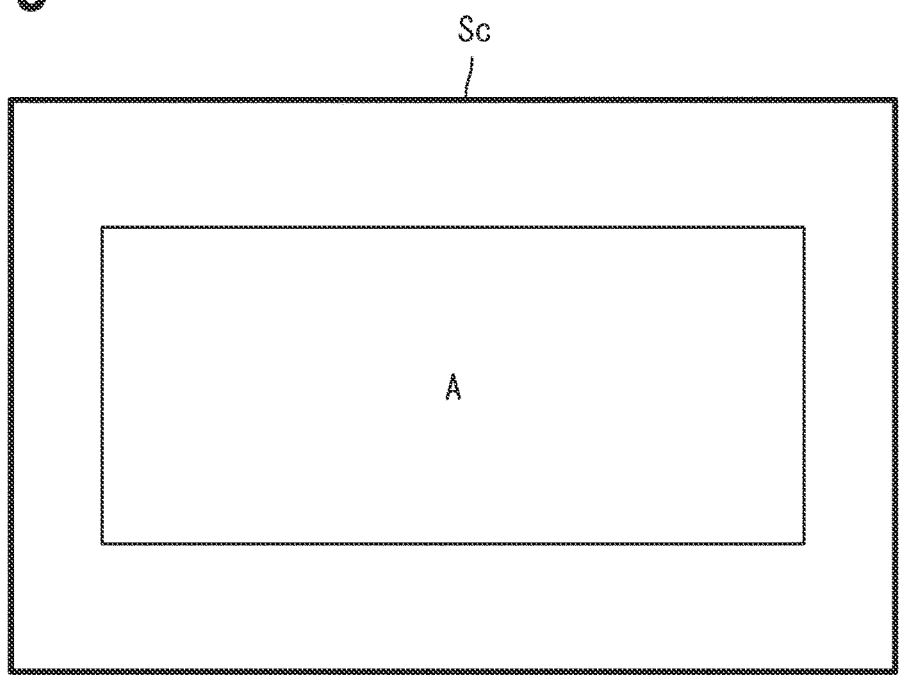
FIG. 5 is a diagram for explaining an example of an exchange instruction display.

In the first situation, the action determination unit estimates that the traffic congestion will be eliminated based on the information received by the communication module 20 before the traffic congestion is actually eliminated (see PCE in FIG. 4). Then, before the period in which the traffic congestion is expected to be eliminated (see PE in FIG. 4), the display control unit 105 controls to display the exchange instruction (see TOR in FIG. 4). It should be noted that the period in which the traffic congestion is expected to be eliminated may be estimated by the action determination unit based on the information received by the communication module 20. As an example of the exchange instruction display in the first situation, a display including a content indicating that the traffic congestion is expected to be eliminated may be performed in addition to the content requesting the driving operation exchange. For example, in the area A shown in FIG. 5, a display such as "The traffic congestion will be eliminated in XX seconds. Please prepare to drive." Sc in FIG. 5 shows a display screen of the display device 90. The region A may be the entire display surface of the display device 90 or a partial region of the display surface of the display device 90.

After the exchange instruction is displayed, the exchange of driving operation is completed (see CF in FIG. 4). The HCU 10 may determine that the driving operation exchange has been completed based on, for example, detection of gripping of the steering wheel by a gripping sensor provided on the steering wheel. It may be preferable that the exchange instruction display is continued to be performed until the driving operation exchange is completed. When the driving operation exchange is completed, the display after driving operation exchange is started under the control of the display control unit 105 (see ACI in FIG. 4). At the timing when the display after driving operation exchange starts, the traffic congestion autonomous driving operation is switched to the driver-required driving operation. It should be noted that the switching from the traffic congestion autonomous driving operation to the driver-required driving operation may be performed at the same timing as the completion of the driving operation exchange. Then, after the completion of the driving operation exchange and after the traffic congestion is eliminated, it is possible to increase the vehicle speed, so the driver increases the vehicle speed of the subject vehicle by the driver's driving operation (see SUT in FIG. 4). Here, in the case of the driving operation exchange to level 2 autonomous driving operation, the vehicle speed of the subject vehicle may increase under the control of the autonomous driving system side.

Figure 6:
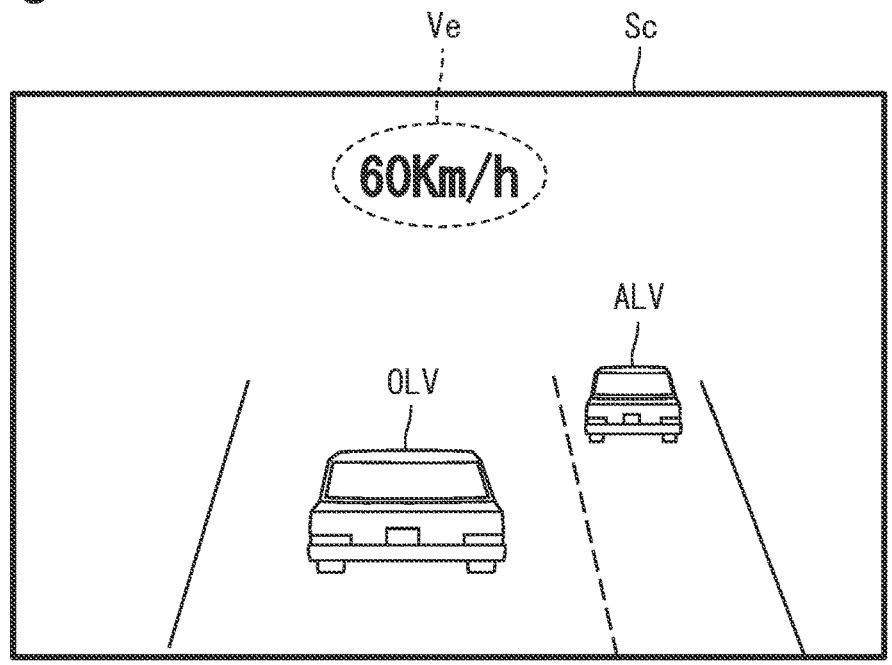
FIG. 6 is a diagram for explaining an example of a display after the driving operation exchange in the first situation.

As an example of the display after driving operation exchange in the first situation, a display including not only the information of the subject vehicle lane but also the information of the surrounding lanes may be performed. This is because, as described above, the speed of the subject vehicle increases, and more attention needs to be paid to the surroundings of the subject vehicle. For example, as shown in FIG. 6, a diagram showing the positional relationship between the subject vehicle and the surrounding vehicles in the subject vehicle lane (see OLV in FIG. 6) and a diagram showing the positional relationship between the subject vehicle and the surrounding vehicles in the surrounding lanes (see ALV in FIG. 6) is displayed. In this case, it is sufficient to also display lines indicating the division lines between the subject vehicle lane and the surrounding lanes. Also, an image (Ve in FIG. 6) indicating the vehicle speed of the subject vehicle may be displayed.

Example of Display Control According to Second Situation

Figure 7:
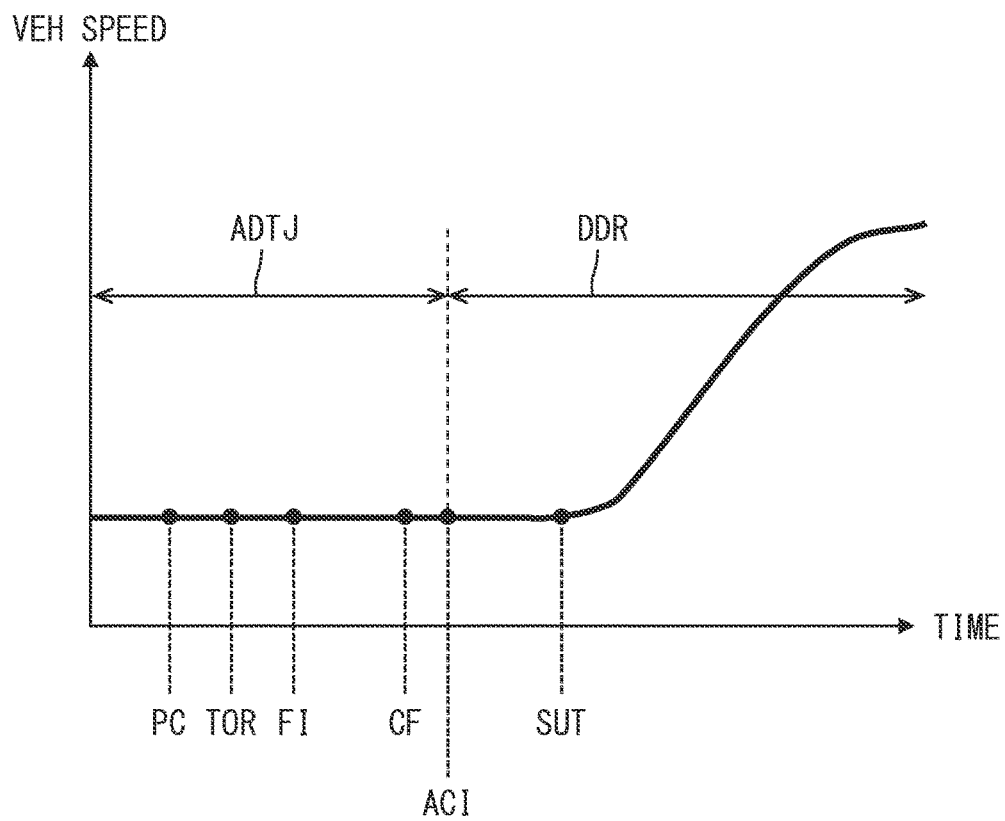
FIG. 7 is a diagram for explaining the timing of events related to display control in the second situation.

Next, an example of display control according to the second situation will be described. FIG. 7 is a diagram for explaining the timing of events related to display control in the second situation. The vertical axis in FIG. 7 indicates the vehicle speed of the subject vehicle. The horizontal axis in FIG. 7 indicates time. PC in FIG. 7 indicates the timing at which the traffic congestion is eliminated. Fl in FIG. 7 indicates the timing at which the advance display is performed.

In the second situation, the elimination of traffic congestion cannot be predicted, and the traffic congestion is eliminated suddenly (see PC in FIG. 7). The traffic congestion elimination itself may be configured to be determined by the action determination unit as described above. Then, as soon as the traffic congestion is eliminated, the display control unit 105 controls to display the exchange instruction (see TOR in FIG. 7). As an example of the exchange instruction display in the second situation, a display including a content indicating that the traffic congestion has been eliminated may be performed in addition to the content requesting the driving operation exchange. For example, in the area A shown in FIG. 5, a display such as "The traffic congestion has been eliminated. Please prepare to drive immediately."

Figure 8:
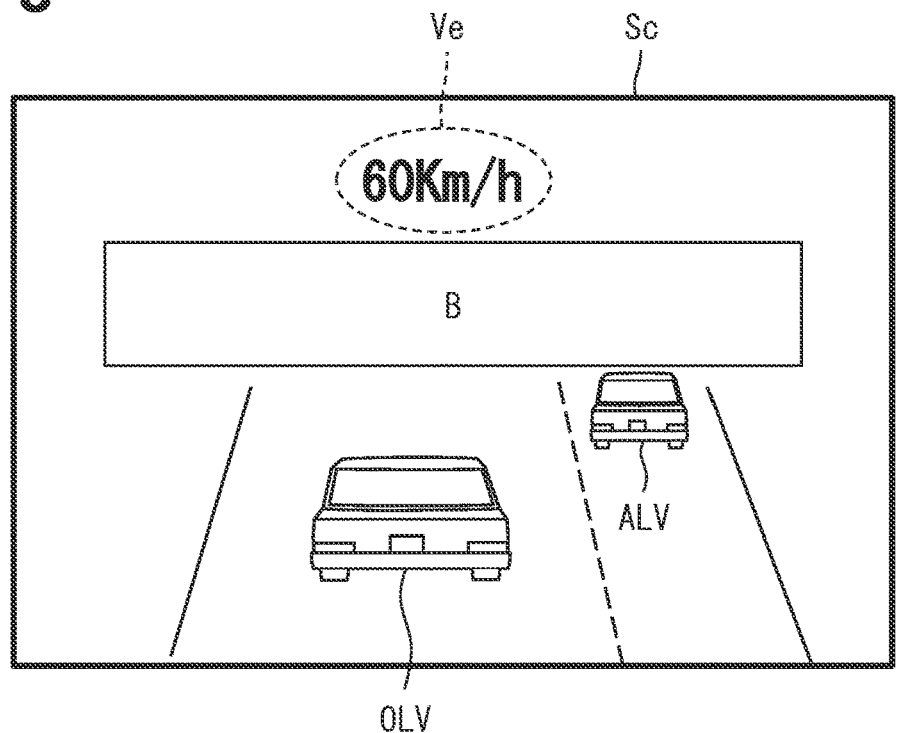
FIG. 8 is a diagram for explaining an example of a display in which an advance display and an exchange instruction display are combined in a second situation.

After the exchange instruction display is performed and before the driving operation exchange is completed, the advance display is started under the control of the display control unit 105 (see Fl in FIG. 7). For example, the advance display may be started within a period estimated to be the minimum necessary from the start of the exchange instruction display to the completion of the driving operation exchange. Alternatively, a configuration may be adopted in which the advance display is started at the same timing as the exchange instruction display. As an example of the advance display in the second situation, a display similar to the display after driving operation exchange in the first situation may be performed. When performing the advance display, it may preferable to display the exchange instruction display in addition to the advance display until the driving operation exchange is completed. Therefore, for example, as shown in FIG. 8, in addition to the display shown in FIG. 6, a phrase "Please prepare to drive" may be displayed in B in FIG. 8 The exchange instruction display to be performed together with the advance display may have the same content as that in the case of not being performed together with the advance display, or may have simplified content. Here, when the exchange instruction display is performed together with the advance display, it may be preferable to make the display area narrower than when the advance display is not performed together so as not to interfere with the advance display.

After the advance display is performed, the exchange of driving operation is completed (see CF in FIG. 7). When the driving operation exchange is completed, the display after driving operation exchange is started under the control of the display control unit 105 (see ACI in FIG. 7). The display after driving operation exchange may have the same content as the advance display. When the exchange instruction display is performed together with the advance display, the information obtained by removing the exchange instruction display information from the advance display information may be used as the display after driving operation exchange. At the timing when the display after driving operation exchange starts, the traffic congestion autonomous driving operation is switched to the driver-required driving operation. It should be noted that the switching from the traffic congestion autonomous driving operation to the driver-required driving operation may be performed at the same timing as the completion of the driving operation exchange. Then, after the completion of the driving operation exchange and after the traffic congestion is eliminated, it is possible to increase the vehicle speed, so the driver increases the vehicle speed of the subject vehicle by the driver's driving operation (see SUT in FIG. 7). Here, in the case of the driving operation exchange to level 2 autonomous driving operation, the vehicle speed of the subject vehicle may increase under the control of the autonomous driving system side. The display after driving operation exchange in the second situation may be the same as the display after driving operation exchange in the first situation. For example, it may be similar to the example in FIG. 6.

Example of Display Mode According to Third Situation

Figure 9:
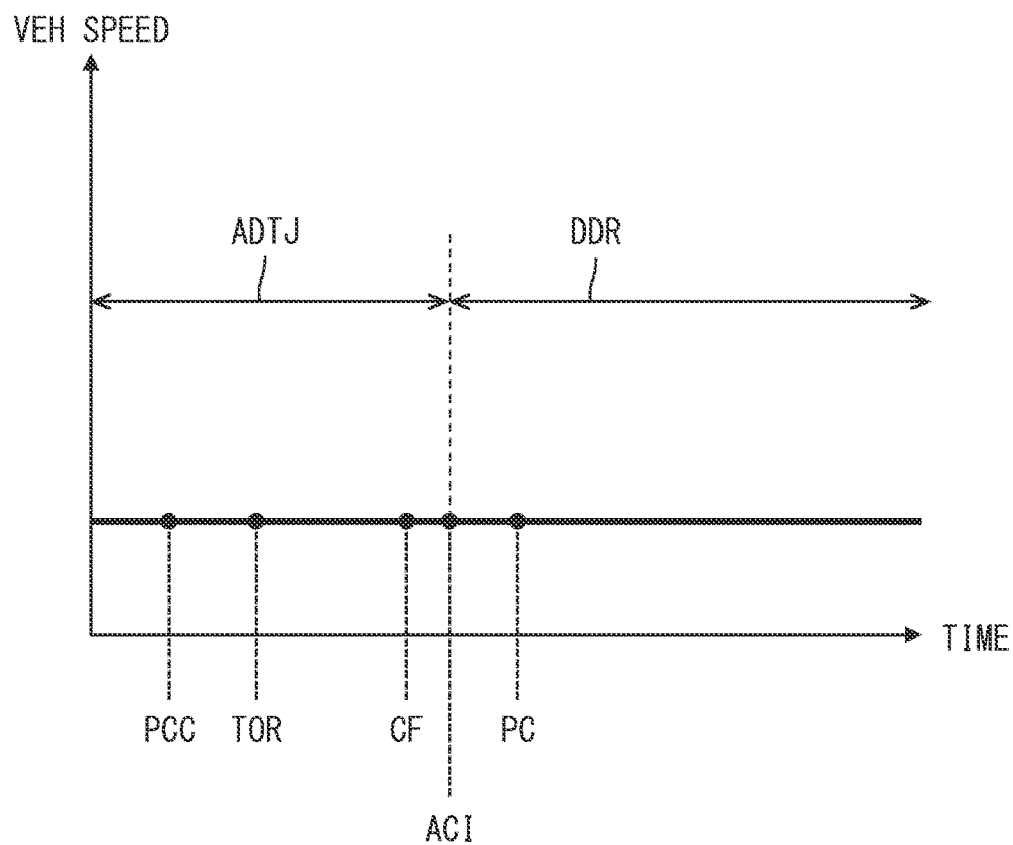
FIG. 9 is a diagram for explaining the timing of events related to display control in the third situation.

Next, an example of display control according to the third situation will be described. FIG. 9 is a diagram for explaining the timing of events related to display control in the third situation. The vertical axis in FIG. 9 indicates the vehicle speed of the subject vehicle. The horizontal axis in FIG. 9 indicates time. PCC in FIG. 9 shows the timing at which the exchange factor other than the elimination of traffic congestion is expected. PC in FIG. 9 indicates the timing at which the exchange factor other than the elimination of traffic congestion occurs. The exchange factor other than the elimination of traffic congestion in the third situation is predictable exchange factor.

In the third situation, the action determination unit estimates the occurrence of the exchange factor other than the elimination of traffic congestion based on high-precision map data, and the like before the occurrence of the exchange factor other than the elimination of traffic congestion (see PCC in FIG. 9). Then, before the timing at which the exchange factor other than the elimination of traffic congestion occurs, the exchange instruction display is performed under the control of the display control unit 105 (see TOR in FIG. 9). It should be noted that the timing at which the exchange factor other than the elimination of the traffic congestion occurs may be determined by the action determination unit based on, for example, the point at which this exchange factor occurs and the vehicle speed of the subject vehicle. As an example of the exchange instruction display in the third situation, a display including a content indicating that the exchange factor other than the traffic congestion is expected to occur may be performed in addition to the content requesting the driving operation exchange. For example, in the area A shown in FIG. 5, a display such as "Autonomous driving operation is not allowable because the road ahead is a single lane. Please prepare to drive" may be performed.

After the exchange instruction is displayed, the exchange of driving operation is completed (see CF in FIG. 9). It may be preferable that the exchange instruction display is continued to be performed until the driving operation exchange is completed. When the driving operation exchange is completed, the display after driving operation exchange is started under the control of the display control unit 105 (see ACI in FIG. 9). At the timing when the display after driving operation exchange starts, the traffic congestion autonomous driving operation is switched to the driver-required driving operation. It should be noted that the switching from the traffic congestion autonomous driving operation to the driver-required driving operation may be performed at the same timing as the completion of the driving operation exchange. In the third situation, even after the completion of the driving operation exchange, the traffic congestion is not eliminated and the vehicle speed is not increased, so the vehicle speed is maintained even after the driving operation exchange.

Figure 10:
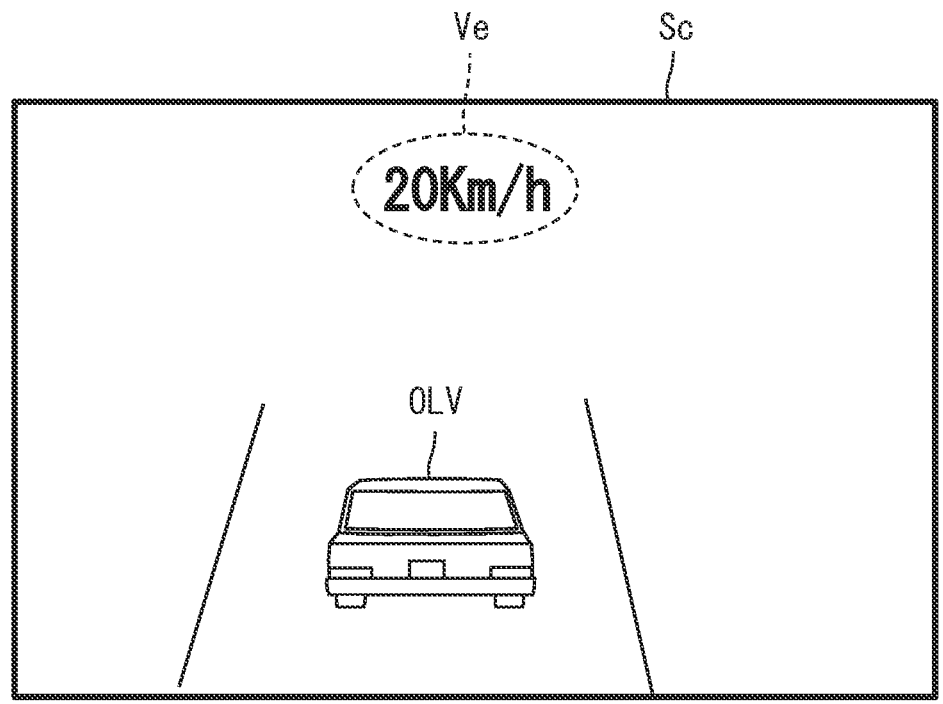
FIG. 10 is a diagram for explaining an example of a display after the driving operation exchange in a third situation.

As an example of the display after driving operation exchange in the third situation, a display including only the information of the subject vehicle lane, out of the information of the subject vehicle lane and the information of the surrounding lanes, may be performed. This is because, as described above, the speed of the subject vehicle does not increase, and the need to pay attention to the surroundings of the subject vehicle is low. For example, as shown in FIG. 10, a diagram (see OLV in FIG. 10) showing the positional relationship between the subject vehicle and surrounding vehicles in the subject vehicle lane may be displayed. In this case, even if there are other vehicles in the surrounding lane, the diagram showing the positional relationship between the subject vehicle and the surrounding vehicles in the surrounding lane is not displayed. In addition, it is only necessary to display only the lines indicating the division lane markings of the subject vehicle lane, out of the subject vehicle lane and the surrounding lanes. Also, an image (Ve in FIG. 10) indicating the vehicle speed of the subject vehicle may be displayed.

Figure 11:
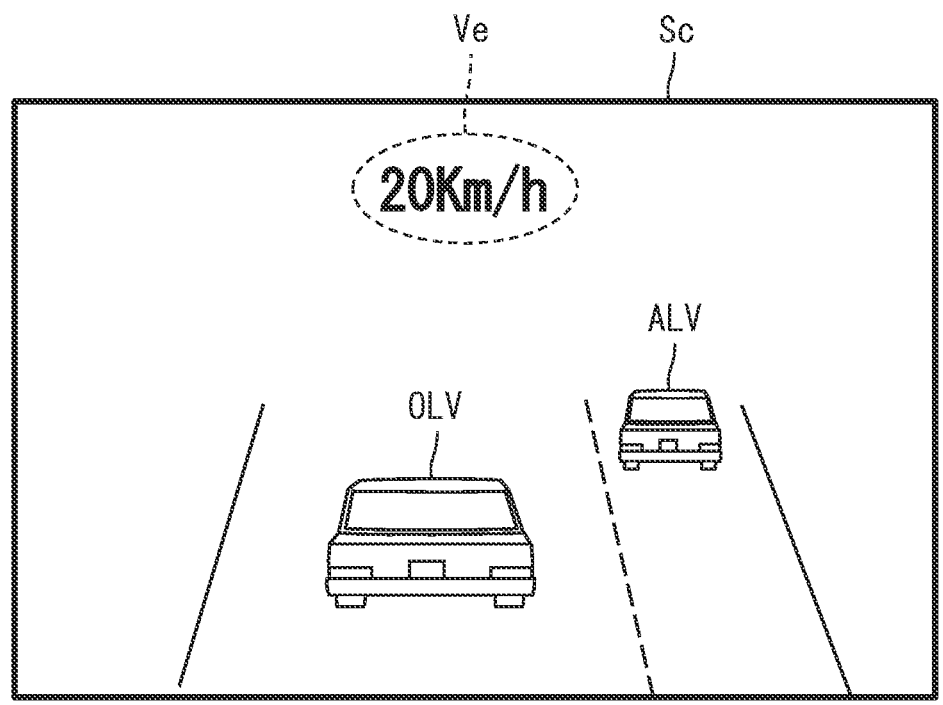
FIG. 11 is a diagram for explaining an example of a display after the driving operation exchange in the third situation.

Here, even in a case where the display after driving operation exchange including only the information of the subject vehicle lane among the information of the subject vehicle lane and the information of the surrounding lanes is performed, when the interruption specification unit 103 specifies that the surrounding vehicle interrupts into the subject vehicle lane, or when the override detection unit 104 detects an override operation, the display may be changed to the display after driving operation exchange including information on surrounding lanes in addition to information on the subject vehicle lane. For example, as shown in FIG. 11, a diagram showing the positional relationship between the subject vehicle and the surrounding vehicles in the subject vehicle lane (see OLV in FIG. 11) and a diagram showing the positional relationship between the subject vehicle and the surrounding vehicles in the surrounding lanes (see ALV in FIG. 11) is displayed. In addition, it is sufficient to display a line indicating the division lane marking between the subject vehicle lane and the surrounding lane. Also, an image (Ve in FIG. 11) indicating the vehicle speed of the subject vehicle may be displayed.

Example of Display Mode According to Fourth Situation

Figure 12:
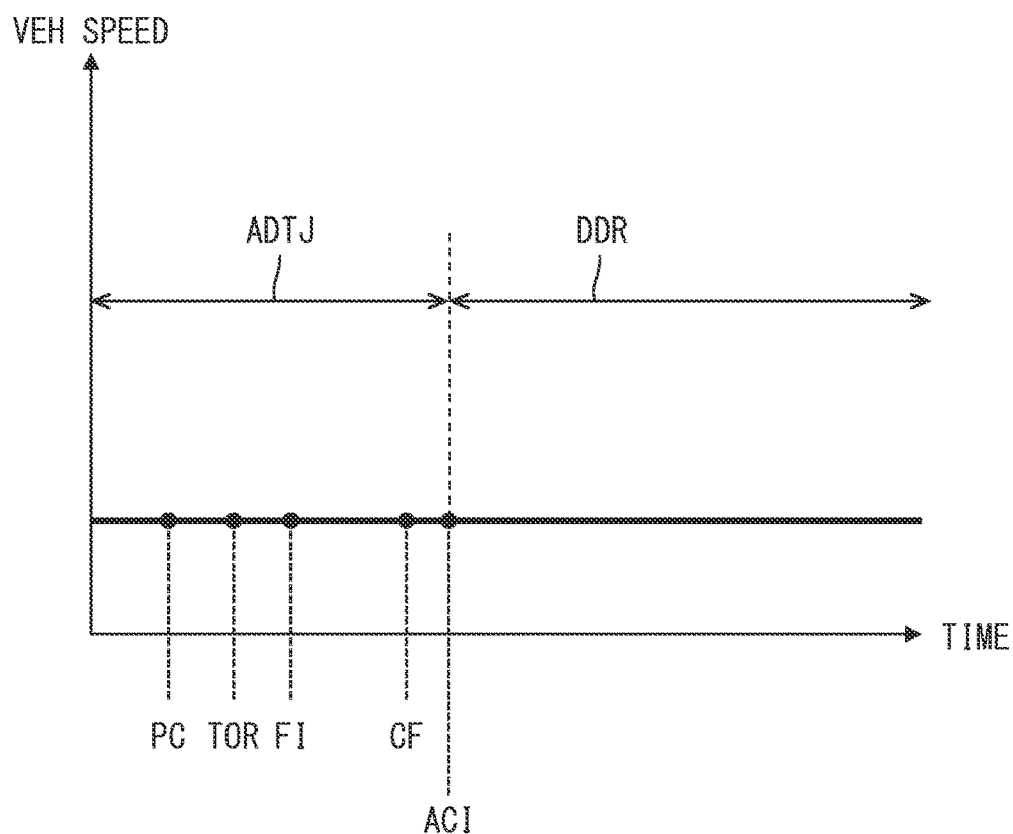
FIG. 12 is a diagram for explaining the timing of events related to display control in the fourth situation.

Next, an example of display control according to the fourth situation will be described. FIG. 12 is a diagram for explaining the timing of events related to display control in the fourth situation. The vertical axis in FIG. 12 indicates the vehicle speed of the subject vehicle. The horizontal axis in FIG. 12 indicates time. PC in FIG. 12 indicates the timing at which the exchange factor other than the elimination of traffic congestion occurs. The exchange factor other than the elimination of traffic congestion in the fourth situation is not-predictable exchange factor.

In the fourth situation, the exchange factor other than the elimination of traffic congestion cannot be predicted, and the exchange factor other than the elimination of traffic congestion suddenly occurs (see PC in FIG. 12). The occurrence of the exchange factor other than the elimination of traffic congestion may be determined by the action determination unit as described above. Then, as soon as the exchange factor other than the elimination of the traffic congestion occurs, the display control unit 105 controls to display the exchange instruction (see TOR in FIG. 12). As an example of the exchange instruction display in the fourth situation, a display including a content indicating that the exchange factor other than the traffic congestion occurs may be performed in addition to the content requesting the driving operation exchange. For example, in the area A shown in FIG. 5, a message such as "Stop autonomous driving operation due to bad weather. Please prepare to drive immediately" may be displayed.

Figure 13:
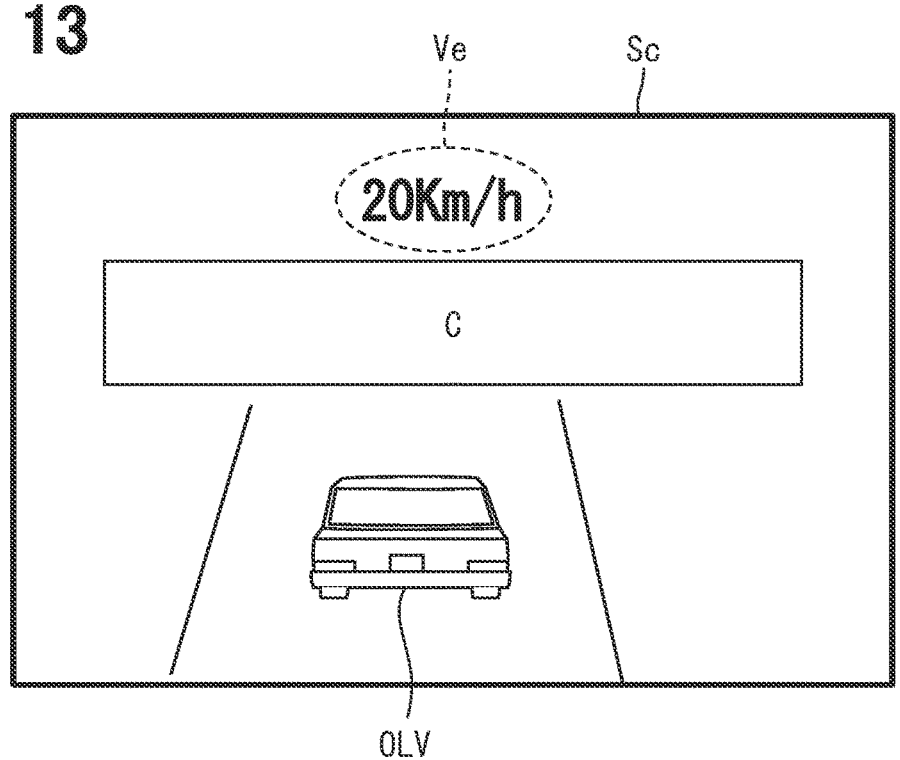
FIG. 13 is a diagram for explaining an example of a display in which an advance display and an exchange instruction display are combined in a fourth situation.

After the exchange instruction display is performed and before the driving operation exchange is completed, the advance display is started under the control of the display control unit 105 (see Fl in FIG. 12). For example, the advance display may be started within a period estimated to be the minimum necessary from the start of the exchange instruction display to the completion of the driving operation exchange. Alternatively, a configuration may be adopted in which the advance display is started at the same timing as the exchange instruction display. As an example of the advance display in the fourth situation, a display similar to the display after driving operation exchange in the third situation may be performed. When performing the advance display, it may preferable to display the exchange instruction display in addition to the advance display until the driving operation exchange is completed. Therefore, for example, as shown in FIG. 13, in addition to the display shown in FIG. 10, a phrase "Please prepare to drive" may be displayed in C in FIG. 13 The exchange instruction display to be performed together with the advance display may have the same content as that in the case of not being performed together with the advance display, or may have simplified content. Here, when the exchange instruction display is performed together with the advance display, it may be preferable to make the display area narrower than when the advance display is not performed together so as not to interfere with the advance display.

After the advance display is performed, the exchange of driving operation is completed (see CF in FIG. 12). When the driving operation exchange is completed, the display after driving operation exchange is started under the control of the display control unit 105 (see ACI in FIG. 12). The display after driving operation exchange may have the same content as the advance display. When the exchange instruction display is performed together with the advance display, the information obtained by removing the exchange instruction display information from the advance display information may be used as the display after driving operation exchange. At the timing when the display after driving operation exchange starts, the traffic congestion autonomous driving operation is switched to the driver-required driving operation. It should be noted that the switching from the traffic congestion autonomous driving operation to the driver-required driving operation may be performed at the same timing as the completion of the driving operation exchange. In the fourth situation, even after the completion of the driving operation exchange, the traffic congestion is not eliminated and the vehicle speed is not increased, so the vehicle speed is maintained even after the driving operation exchange. The display after driving operation exchange in the fourth situation may be the same as the display after driving operation exchange in the third situation. For example, it may be similar to the example in FIG. 10.

Here, even in a case where the display after driving operation exchange including only the information of the subject vehicle lane among the information of the subject vehicle lane and the information of the surrounding lanes is performed, when the interruption specification unit 103 specifies that the surrounding vehicle interrupts into the subject vehicle lane, or when the override detection unit 104 detects an override operation, the display may be changed to the display after driving operation exchange including information on surrounding lanes in addition to information on the subject vehicle lane. For example, it may be similar to the example in FIG. 11.

<Display Control Related Process Executed by HCU 10>

Figure 14:
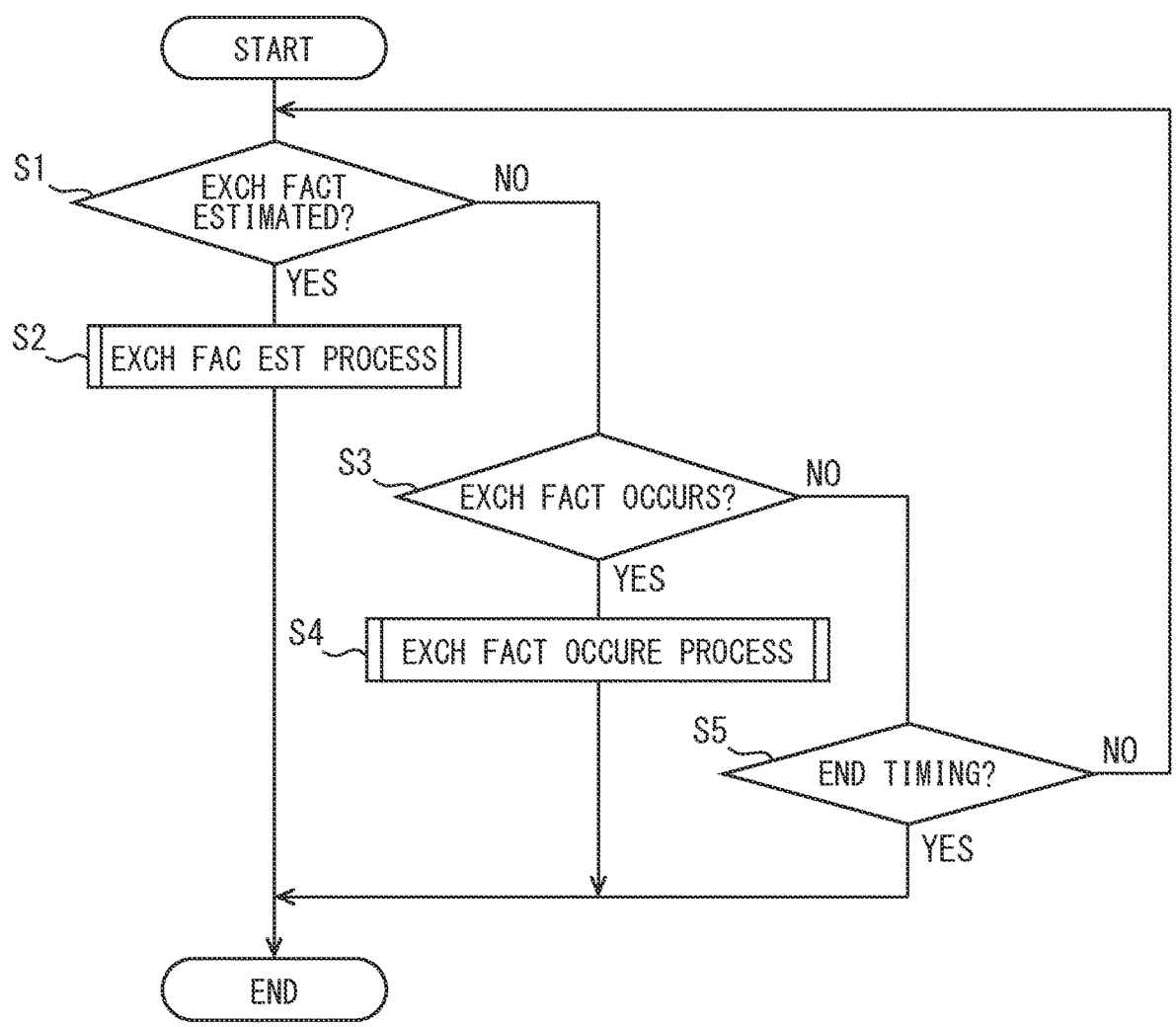
FIG. 14 is a flowchart showing an example of a display control related process executed by the HCU.
Figure 15:
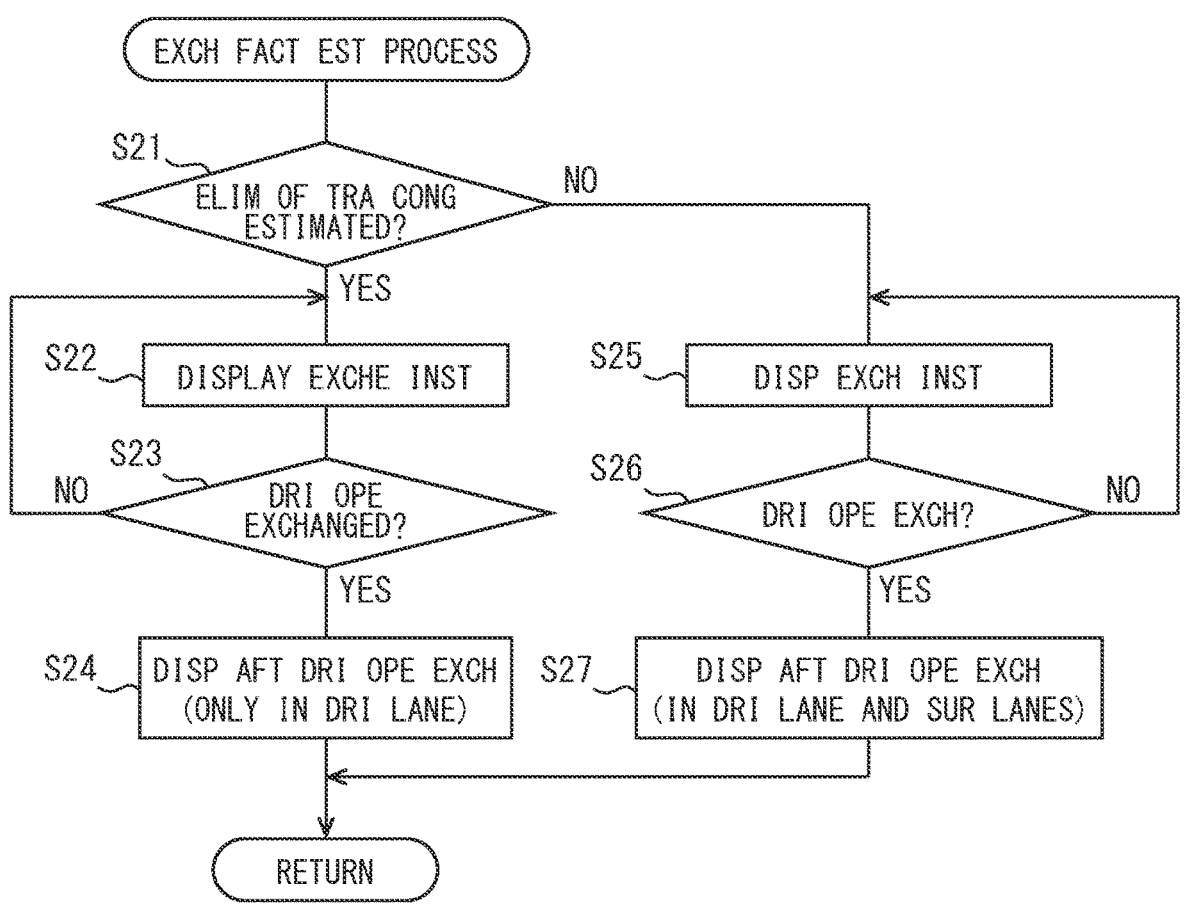
FIG. 15 is a flow chart showing an example of the flow of an exchange factor estimation process.
Figure 16:
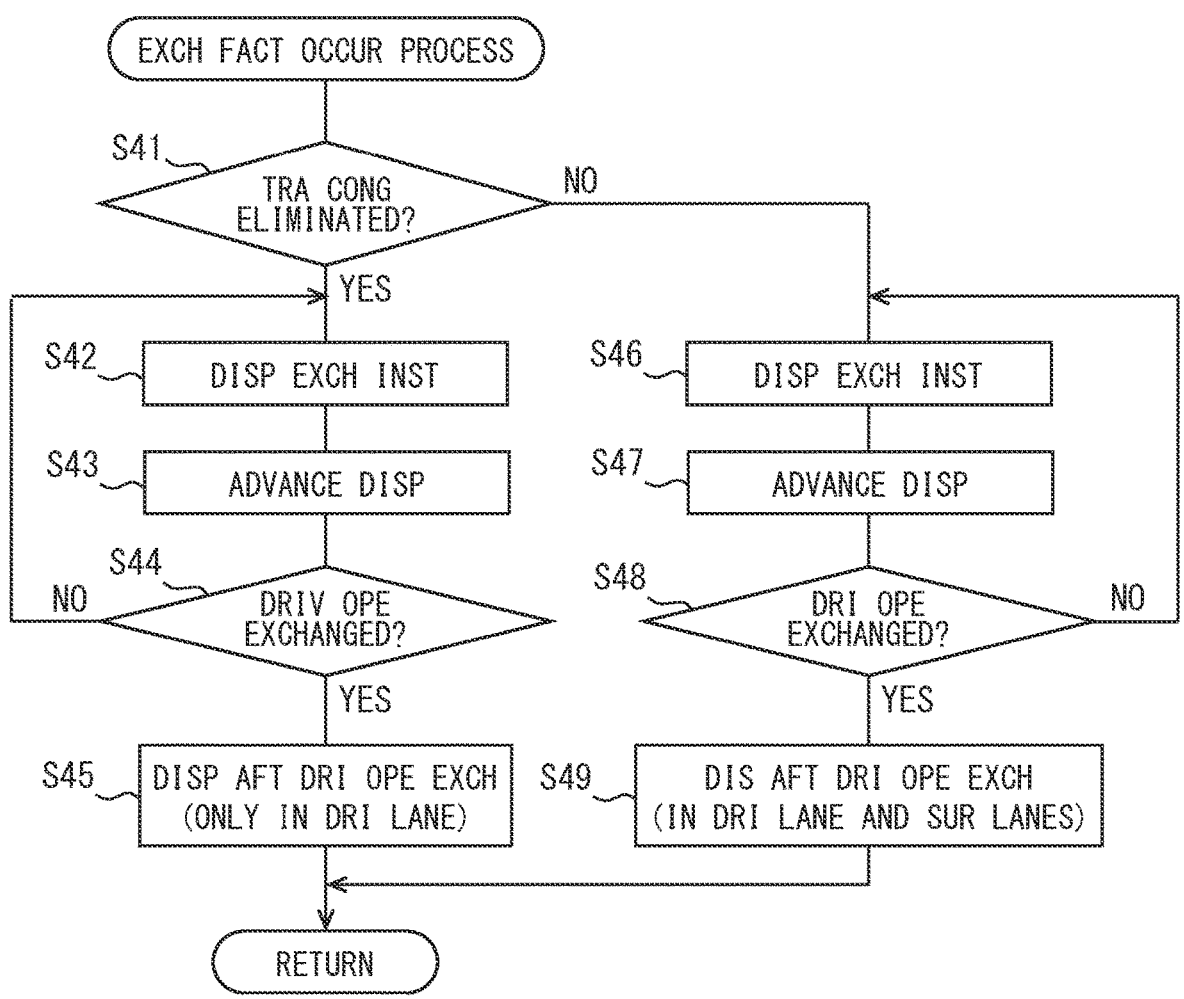
FIG. 16 is a flow chart showing an example of the flow of an exchange factor generation process.

Here, an example of the flow of processing related to display control in the HCU 10 (hereinafter referred to as display control-related processing) will be described using flowcharts of FIGS. 14 to 16. The flowchart of FIG. 14 may be configured to be started, for example, when the subject vehicle starts the traffic congestion autonomous driving operation.

First, in step S1, when an exchange factor is predicted ("YES" in S1), the process proceeds to step S2. On the other hand, when the exchange factor is not predicted ("NO" in S1), the process proceeds to step S3. The HCU 10 may determine whether or not the exchange factor has been predicted by acquiring the determination result of the action determination unit of the autonomous driving ECU 80.

In step S2, the HCU 10 performs an exchange factor estimation process, and ends the display control related process. Here, an example of the flow of the exchange factor estimation process will be described using the flowchart of FIG. 15.

In step S21, when the estimated exchange factor is the elimination of traffic congestion ("YES" in S21), the process proceeds to step S22. On the other hand, when the estimated exchange factor is other than the elimination of traffic congestion ("NO" in S21), the process proceeds to step S25.

In step S22, the display control unit 105 causes the display device 90 to display the exchange instruction in the same manner as described in the example of the display mode corresponding to the first situation. In step S23, when the driving operation exchange has been completed ("YES" in S23), the display control unit 105 terminates the exchange instruction display, and proceeds to step S24. On the other hand, when the driving operation exchange has not been completed ("NO" in S23), the process returns to S22 and repeats the process. Whether or not the driving operation exchange has been completed may be determined by, for example, whether or not the HCU 10 has detected that the steering wheel is gripped as described above.

In step S24, the display control unit 105 causes the display 90 to perform the same display after driving operation exchange as described in the example of the display mode according to the first situation, and the display control-related processing ends. More specifically, the display after driving operation exchange including only the information of the subject vehicle lane among the information of the subject vehicle lane and the information of the surrounding lanes is performed.

In step S25, the display control unit 105 causes the display device 90 to display the exchange instruction in the same manner as described in the example of the display mode corresponding to the third situation. In step S26, when the driving operation exchange has been completed ("YES" in S26), the display control unit 105 terminates the exchange instruction display, and proceeds to step S27. On the other hand, when the driving operation exchange has not been completed ("NO" in S26), the process returns to S25 and repeats the process.

In step S27, the display control unit 105 causes the display 90 to perform the same display after driving operation exchange as described in the example of the display mode according to the third situation, and the display control-related processing ends. More specifically, the display after driving operation exchange including information on subject vehicle lane and information on surrounding lanes is performed.

Returning to FIG. 14, in step S3, when the occurrence of the exchange factor is determined ("YES" in S3), the process proceeds to step S4. On the other hand, when the occurrence of the exchange factor is not determined ("NO" in S3), the process proceeds to step S5. Whether or not the exchange factor has occurred may be determined by whether the HCU 10 has acquired the exchange request in the exchange request acquisition unit 101.

In step S4, the HCU 10 performs an exchange factor occurrence process, and ends the display control related process. Here, an example of the flow of the exchange factor occurrence process will be described using the flowchart of FIG. 16.

In step S41, when the exchange factor is the elimination of traffic congestion ("YES" in S41), the process proceeds to step S42. On the other hand, when the exchange factor is other than the elimination of traffic congestion ("NO" in S41), the process proceeds to step S46.

In step S42, the display control unit 105 causes the display device 90 to display the exchange instruction in the same manner as described in the example of the display mode corresponding to the second situation. In step S43, the display control unit 105 causes the display device 90 to display the advance display in the same manner as described in the example of the display mode corresponding to the second situation. More specifically, the advance display including only the information of the subject vehicle lane among the information of the subject vehicle lane and the information of the surrounding lanes is performed. It should be noted that the display control unit 105 may be configured to display the exchange instruction at the same time even when the advance display is started.

In step S44, when the driving operation exchange has been completed ("YES" in S44), the display control unit 105 terminates the exchange instruction display and the advance display, and proceeds to step S45. It should be noted that by continuing only the advance display out of the exchange instruction display and the advance display, the advance display may be used as the display after driving operation exchange, which will be described later. On the other hand, when the driving operation exchange has not been completed ("NO" in S44), the process returns to S42 and repeats the process.

In step S45, the display control unit 105 causes the display 90 to perform the same display after driving operation exchange as described in the example of the display mode according to the third situation, and the display control-related processing ends. More specifically, the display after driving operation exchange including only the information of the subject vehicle lane among the information of the subject vehicle lane and the information of the surrounding lanes is performed.

In step S46, the display control unit 105 causes the display device 90 to display the exchange instruction in the same manner as described in the example of the display mode corresponding to the fourth situation. In step S47, the display control unit 105 causes the display device 90 to display the advance display in the same manner as described in the example of the display mode corresponding to the fourth situation. More specifically, the advance display including information on the subject vehicle lane and information on surrounding lanes is performed. It should be noted that the display control unit 105 may be configured to display the exchange instruction at the same time even when the advance display is started.

In step S48, when the driving operation exchange has been completed ("YES" in S48), the display control unit 105 terminates the exchange instruction display and the advance display, and proceeds to step S49. It should be noted that by continuing only the advance display out of the exchange instruction display and the advance display, the advance display may be used as the display after driving operation exchange, which will be described later. On the other hand, when the driving operation exchange has not been completed ("NO" in S48), the process returns to S46 and repeats the process.

In step S49, the display control unit 105 causes the display 90 to perform the same display after driving operation exchange as described in the example of the display mode according to the fourth situation, and the display control-related processing ends. More specifically, the display after driving operation exchange including information on subject vehicle lane and information on surrounding lanes is performed.

Returning to FIG. 14, in S5, when it is the end time of the display control related process (S5: YES), the HCU 2 ends the display control related process. In S5, when it is yet not the end time of the display control related process (S5: NO), the process returns to S1 and repeats the process. One example of the end timing of the display control related process is a timing when the power switch is turned off.

Here, even in a case where the display after driving operation exchange including only the information of the subject vehicle lane among the information of the subject vehicle lane and the information of the surrounding lanes is performed, when the interruption specification unit 103 specifies that the surrounding vehicle interrupts into the subject vehicle lane, or when the override detection unit 104 detects an override operation, the display control unit 105 may change the display to the display after driving operation exchange including information on surrounding lanes in addition to information on the subject vehicle lane.

Overview of First Embodiment

According to the first embodiment, when the switching from the traffic congestion autonomous driving operation to the driver-required driving operation is necessary, depending on the situation of the vehicle in which the switching from the traffic congestion autonomous driving operation to the driver-required driving operation is necessary, at least one of the display timing and the display content relating to the driving operation exchange from the traffic congestion autonomous driving operation to the driver-required driving operation is changed. Therefore, it is possible to execute the display with at least one of the timing and the content that match the situation of the vehicle in which it is necessary to switch from the traffic congestion autonomous driving operation to the driver-required driving operation. As a result, when the driving operation is switched from the traffic congestion autonomous driving operation to the driver-required driving operation, it is possible to give a notification that is easier for the driver to understand depending on the situation.

Second Embodiment

In the first embodiment, as an example of switching the degree of detail of the information about the surroundings of the subject vehicle in the display after driving operation exchange, a configuration is described to switch the displaying of the information of only the subject vehicle lane out of the subject vehicle lane and the surrounding lanes, or the displaying of the information of the surrounding lanes in addition to the subject vehicle lane. The configuration is not necessarily limited to this feature. For example, in the display after driving operation exchange with a low level of detail, information about the vicinity of the subject vehicle is displayed. In the display after driving operation exchange with a high level of detail, information not only in the vicinity of the subject vehicle but also far away from the subject vehicle may be displayed.

Third Embodiment

In the first embodiment, an example has been shown in which the situations of the subject vehicle that require the driving operation exchange are classified into four types of situations. Alternatively, it is not necessarily limited to this feature. For example, the above-mentioned first situation and second situation may be classified into the same category, while the third situation and the fourth situation may be classified into the same category. Alternatively, the first situation and the third situation may be classified in the same category, while the second situation and the fourth situation may be classified in the same category.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The controller and the method thereof described in the present disclosure may be implemented by a special purpose computer which includes a processor programmed to execute one or more functions executed by a computer program. Alternatively, the device and the method thereof described in the present disclosure may be implemented by a special purpose hardware logic circuit. Alternatively, the device and the method thereof described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display control device for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control device comprising:
a display control unit that performs a display relating to a driving operation exchange from the traffic congestion autonomous driving operation to the driver required driving operation when a switching from the traffic congestion autonomous driving operation to the driver required driving operation is requested; and
a situation specification unit that specifies a situation of the vehicle in which the switching from the traffic congestion autonomous driving operation to the driver required driving operation is requested, with specifying a type of an exchange factor as a factor of the switching, wherein:
the display control unit changes at least one of a timing of the display and a content of the display relating to the driving operation exchange according to the type of the exchange factor in the situation specified by the situation specification unit;
the display relating to the driving operation exchange includes an exchange instruction display for instructing the driver to change the driving operation;
the display control unit changes the timing of the display and the content of the display relating to the driving operation exchange according to whether the situation specified by the situation specification unit is a situation in which the exchange instruction display is performed before an exchange factor occurs as a factor of requesting the switching from the traffic congestion autonomous driving operation to the driver required driving operation; and
after performing the display, if the driver does not start the driving operation, the traffic congestion autonomous driving operation is continued.

2. The vehicle display control device according to claim 1, further comprising:
one or more processors, wherein:
the one or more processors provide at least one of: the display control unit and the situation specification unit.

3. A vehicle display control system for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control device comprising:

a display device that is arranged in the vehicle with a display surface opposing to an interior of the vehicle; and the vehicle display control device according to claim 1, which controls a display on the display device.

4. A vehicle display control device for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control device comprising:

a display control unit that performs a display relating to a driving operation exchange from the traffic congestion autonomous driving operation to the driver required driving operation when a switching from the traffic congestion autonomous driving operation to the driver required driving operation is requested; and a situation specification unit that specifies a situation of the vehicle in which the switching from the traffic congestion autonomous driving operation to the driver required driving operation is requested, wherein:

the display control unit changes at least one of a timing of the display and a content of the display relating to the driving operation exchange according to the situation specified by the situation specification unit;

the display relating to the driving operation exchange includes an exchange instruction display for instructing the driver to change the driving operation;

the display control unit changes the timing of the display and the content of the display relating to the driving operation exchange according to whether the situation specified by the situation specification unit is a situation in which the exchange instruction display is performed before an exchange factor occurs as a factor of requesting the switching from the traffic congestion autonomous driving operation to the driver required driving operation; and after performing the display, if the driver does not start the driving operation, the traffic congestion autonomous driving operation is continued.

5. The vehicle display control device according to claim 4, wherein:

when the situation specified by the situation specification unit is a situation in which the exchange instruction display is performed after the exchange factor occurs, the display control unit performs an advance display, for display information to be displayed after the driving operation exchange, in advance before the driving operation exchange is completed; and when the situation is a situation in which the exchange instruction display is performed before the exchange factor occurs, the display control unit does not perform the advance display.

6. The vehicle display control device according to claim 4, further comprising:

one or more processors, wherein:

the one or more processors provide at least one of: the display control unit and the situation specification unit.

7. A vehicle display control device for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control device comprising:

a display control unit that performs a display relating to a driving operation exchange from the traffic congestion autonomous driving operation to the driver required driving operation when a switching from the traffic congestion autonomous driving operation to the driver required driving operation is requested; and a situation specification unit that specifies a situation of the vehicle in which the switching from the traffic congestion autonomous driving operation to the driver required driving operation is requested, wherein:

the display control unit changes at least one of a timing of the display and a content of the display relating to the driving operation exchange according to the situation specified by the situation specification unit;

the display relating to the driving operation exchange includes an exchange instruction display for instructing the driver to change the driving operation;

when the situation specified by the situation specification unit is a situation in which the exchange instruction display is performed after an exchange factor occurs as a factor of requesting the switching from the traffic congestion autonomous driving operation to the driver required driving operation, the display control unit performs an advance display, for display information to be displayed after the driving operation exchange, in advance before the driving operation exchange is completed; and when the situation is a situation in which the exchange instruction display is performed before the exchange factor occurs, the display control unit does not perform the advance display; and after performing the display, if the driver does not start the driving operation, the traffic congestion autonomous driving operation is continued.

8. The vehicle display control device according to claim 7, wherein:

when performing the advance display, the display control unit performs the exchange instruction display together with the advance display until the driving operation exchange is completed.

9. The vehicle display control device according to claim 7, wherein:

the display relating to the driving operation exchange includes a display after driving operation exchange that is displayed to the driver after the driving operation exchange;

the display after driving operation exchange includes information about surroundings of the vehicle; and when the situation specified by the situation specification unit is a situation in which an exchange factor as a factor of requesting the switching from the traffic congestion autonomous driving operation to the driver required driving operation is not an elimination of a traffic congestion, the display control unit performs the display after driving operation exchange with a lower degree of detail of the information about the surroundings of the vehicle than the situation in which the exchange factor is the elimination of the traffic congestion.

10. The vehicle display control device according to claim 7, further comprising:

one or more processors, wherein:

the one or more processors provide at least one of: the display control unit and the situation specification unit.

11. A vehicle display control device for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control device comprising:
- a display control unit that performs a display relating to a driving operation exchange from the traffic congestion autonomous driving operation to the driver required driving operation when a switching from the traffic congestion autonomous driving operation to the driver required driving operation is requested; and
- a situation specification unit that specifies a situation of the vehicle in which the switching from the traffic congestion autonomous driving operation to the driver required driving operation is requested, wherein:
- the display control unit changes at least one of a timing of the display and a content of the display relating to the driving operation exchange according to the situation specified by the situation specification unit;
- the display relating to the driving operation exchange includes a display after driving operation exchange that is displayed to the driver after the driving operation exchange;
- the display after driving operation exchange includes information about surroundings of the vehicle;
- when the situation specified by the situation specification unit is a situation in which an exchange factor as a factor of requesting the switching from the traffic congestion autonomous driving operation to the driver required driving operation is not an elimination of a traffic congestion, the display control unit performs the display after driving operation exchange with a lower degree of detail of the information about the surroundings of the vehicle than the situation in which the exchange factor is the elimination of the traffic congestion; and
- after performing the display, if the driver does not start the driving operation, the traffic congestion autonomous driving operation is continued.

12. The vehicle display control device according to claim 11, wherein:
when the situation specified by the situation specification unit is the situation in which the exchange factor is the elimination of the traffic congestion, the display control unit performs the display after driving operation exchange including information of a lane of the vehicle and information of surrounding lanes as the information about the surroundings of the vehicle; and when the situation specified by the situation specification unit is the situation in which the exchange factor is not the elimination of the traffic congestion, the display control unit performs the display after driving operation exchange including only the information of the lane of the vehicle as the information about the surroundings of the vehicle.

13. The vehicle display control device according to claim 12, further comprising:
an interruption specification unit that specifies whether a surrounding vehicle of the vehicle interrupts into the lane of the vehicle, wherein:
when the interruption specification unit specifies an interruption under a condition that the display after driving operation exchange including only the information of the lane of the vehicle as the information about the surroundings of the vehicle is performed, the display control unit changes the display after driving operation exchange to include the information about the surrounding lanes in addition to the information about the lane of the vehicle.

14. The vehicle display control device according to claim 12, further comprising:
an override detection unit that detects an override operation as an operation for the driver of the vehicle to voluntarily acquire a control of the vehicle, wherein:
when the override detection unit detects the override operation under a condition that the display after driving operation exchange including only the information of the lane of the vehicle as the information about the surroundings of the vehicle is performed, the display control unit changes the display after driving operation exchange to include the information about the surrounding lanes in addition to the information about the lane of the vehicle.

15. The vehicle display control device according to claim 11, further comprising:
one or more processors, wherein:
the one or more processors provide at least one of: the display control unit and the situation specification unit.

16. A vehicle display control method for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control method executed by at least one processor comprising:
- a display control step for performing a display relating to a driving operation exchange from the traffic congestion autonomous driving operation to the driver required driving operation when a switching from the traffic congestion autonomous driving operation to the driver required driving operation is requested; and
- a situation specification step for specifying a situation of the vehicle in which the switching from the traffic congestion autonomous driving operation to the driver required driving operation is requested, with specifying a type of an exchange factor as a factor of the switching, wherein:
- the display control step further includes: changing at least one of a timing of the display and a content of the display relating to the driving operation exchange according to the type of the exchange factor in the situation specified in the situation specification step;
- the display relating to the driving operation exchange includes a display after driving operation exchange that is displayed to the driver after the driving operation exchange;
- the display after driving operation exchange includes information about surroundings of the vehicle;
- when the situation specified by the situation specification step is a situation in which an exchange factor as a factor of requesting the switching from the traffic congestion autonomous driving operation to the driver required driving operation is not an elimination of a traffic congestion, the display control step includes performing the display after driving operation exchange with a lower degree of detail of the information about the surroundings of the vehicle than the situation in which the exchange factor is the elimination of the traffic congestion; and after performing the display, if the driver does not start the driving operation, the traffic congestion autonomous driving operation is continued.

17. A vehicle display control method for a vehicle in which a traffic congestion autonomous driving operation for executing an autonomous driving operation that a vehicle side system executes all driving tasks only under a condition including at least a traffic congestion situation and a driver required driving operation that a driver is required to execute at least a part of the driving tasks are executable, the vehicle display control method executed by at least one processor comprising:

performing a display relating to a driving operation exchange from the traffic congestion autonomous driving operation to the driver required driving operation when a switching from the traffic congestion autonomous driving operation to the driver required driving operation is requested; and specifying a situation of the vehicle in which the switching from the traffic congestion autonomous driving operation to the driver required driving operation is requested, wherein:

the performing of the display further includes: changing at least one of a timing of the display and a content of the display relating to the driving operation exchange according to the situation specified in the specifying of the situation, wherein:

the display relating to the driving operation exchange includes an exchange instruction display for instructing the driver to change the driving operation;

the performing of the display further includes: changing the timing of the display and the content of the display relating to the driving operation exchange according to whether the situation specified in the specifying of the situation is a situation in which the exchange instruction display is performed before an exchange factor occurs as a factor of requesting the switching from the traffic congestion autonomous driving operation to the driver required driving operation; and after performing the display, if the driver does not start the driving operation, the traffic congestion autonomous driving operation is continued.

* * * * *